(12) United States Patent
Dorini

(10) Patent No.: US 12,441,056 B2
(45) Date of Patent: Oct. 14, 2025

(54) METHODS AND ASSOCIATED CONTROLLERS FOR APPARATUS FOR THE LAYER-BY-LAYER FORMATION OF THREE-DIMENSIONAL OBJECTS

(71) Applicant: Stratasys Powder Production Ltd., London (GB)

(72) Inventor: Gianluca Dorini, London (GB)

(73) Assignee: Stratasys Powder Production Ltd., Nottingham (GB)

( * ) Notice: Subject to any disclaimer, the term of this patent is extended or adjusted under 35 U.S.C. 154(b) by 550 days.

(21) Appl. No.: 17/920,677

(22) PCT Filed: Apr. 22, 2021

(86) PCT No.: PCT/GB2021/050963
§ 371 (c)(1),
(2) Date: Oct. 21, 2022

(87) PCT Pub. No.: WO2021/214465
PCT Pub. Date: Oct. 28, 2021

(65) Prior Publication Data
US 2023/0191694 A1  Jun. 22, 2023

(30) Foreign Application Priority Data
Apr. 24, 2020 (GB) ..................... 2006088

(51) Int. Cl.
*B29C 64/165* (2017.01)
*B22F 10/28* (2021.01)
(Continued)

(52) U.S. Cl.
CPC ............ *B29C 64/165* (2017.08); *B22F 10/28* (2021.01); *B22F 10/31* (2021.01); *B22F 12/46* (2021.01);
(Continued)

(58) Field of Classification Search
None
See application file for complete search history.

(56) References Cited

U.S. PATENT DOCUMENTS

2004/0104499 A1   6/2004  Keller
2017/0297265 A1*  10/2017 Martinez Fornos .... B29C 64/10

FOREIGN PATENT DOCUMENTS

WO   2016/050322 A1   4/2016
WO   WO-2020023044 A1 *  1/2020 ............. B33Y 50/02
(Continued)

*Primary Examiner* — Yung-Sheng M Tsui
(74) *Attorney, Agent, or Firm* — Honigman LLP; Eric J. Sosenko; Jonathan P. O'Brien

(57) ABSTRACT

A method for determining a set point for measurements from a temperature sensor of an apparatus for the layer-by-layer formation of a three-dimensional object from particulate material, and associated controllers. The method includes distributing a calibration layer of particulate material over a build bed surface; selectively applying absorption-modifying fluid to a reference area or a surrounding area thereof, on the build bed surface; (c) lowering the build bed surface to a calibration depth, (d) applying heat to the reference area using a moveable heat source while measuring the temperature increase of a sub-reference area over a duration of time and/or taking optical readings of an optical property of the sub-reference area over the duration of time; (e) determining the onset of fusion of the particulate material; and (f) applying the onset of fusion as the set point for subsequent temperature measurements.

20 Claims, 12 Drawing Sheets

(51) Int. Cl.
  *B22F 10/31* (2021.01)
  *B22F 12/46* (2021.01)
  *B22F 12/90* (2021.01)
  *B29C 64/153* (2017.01)
  *B29C 64/264* (2017.01)
  *B29C 64/393* (2017.01)
  *G01J 5/80* (2022.01)
  *B33Y 10/00* (2015.01)
  *B33Y 30/00* (2015.01)
  *B33Y 50/02* (2015.01)

(52) U.S. Cl.
  CPC ............ *B22F 12/90* (2021.01); *B29C 64/153* (2017.08); *B29C 64/264* (2017.08); *B29C 64/393* (2017.08); *G01J 5/80* (2022.01); *B33Y 10/00* (2014.12); *B33Y 30/00* (2014.12); *B33Y 50/02* (2014.12)

(56) References Cited

FOREIGN PATENT DOCUMENTS

| | | | | |
|---|---|---|---|---|
| WO | WO-2020027820 A1 * | 2/2020 | ............. | B33Y 50/02 |
| WO | 2020/204911 A1 | 10/2020 | | |

* cited by examiner

METHODS AND ASSOCIATED CONTROLLERS FOR APPARATUS FOR THE LAYER-BY-LAYER FORMATION OF THREE-DIMENSIONAL OBJECTS

FIELD OF THE INVENTION

The present disclosure relates to apparatus for the layer-by-layer formation of three-dimensional (3D) objects from particulate material, and more particularly to methods and associated controllers for determining a set point for the onset of fusion that may be used to calibrate the temperature measurements from a temperature sensor of such apparatus.

BACKGROUND

Applications for forming three dimensional objects from particulate material, such as so-called "print and sinter" or laser sintering processes, are receiving increased interest as they are moving towards faster throughput times and become industrially viable. In these processes, the object is formed layer-by-layer from particulate material that is spread in successive layers across a build surface. Each successive layer of particulate matter is fused, or sintered, over defined regions to form a cross-section of the three-dimensional object. Typically such processes require accurate temperature control of the surface that is being processed to achieve high-quality uniform objects with well-defined properties. Temperature control requires use of a temperature sensor, such as a pyrometer or thermal camera, that detects the temperature of the surface of the layer being processed (the build bed surface). Detection may be continuous or intermittent during processing. For reliable process control from build to build or between different apparatus, it is desirable to have accurate knowledge of the onset of fusion (or sintering), or of the temperature at which fusion occurs and that is being measured since the process of fusion depends on the material characteristic melting point of the material that is being fused. In "print and sinter" processes for example, often some of the powder is recycled and reused and the powder properties are liable to change as a result of ageing. It is therefore important to be able to identify which temperature measurements correspond to the onset of fusion of a given particulate material used in the apparatus.

The onset of fusion may be determined from the characteristic change in the rate of heating when monitoring time-temperature behaviour of a reference area within the build bed surface upon a heating procedure, or by a characteristic change in optical properties when monitoring the reference area using an optical sensor, as the material transitions through a change of phase from the solid phase into the liquid phase. This procedure may thus be carried out in-situ on the apparatus. It is however challenging to apply a suitable combination of process parameters and conditions that achieve a level of control accurate enough to allow detection of this characteristic change of heating rate, specifically where the combination of absorptive properties of the particulate material and the radiation spectrum of the heat source is tuned to achieve rapid fusion, as is typically the case. In a conventional object build process a heat source is passed over the build bed to apply radiation to selectively fuse a cross-section of the object. The selectivity of the heat source is achieved by choosing a spectrum of radiation that overlaps with or comprises the absorption spectrum of the material to be fused. For example, a radiation-absorbing fluid may be deposited over the build bed surface to define the cross-section of the object. The radiation-absorbing fluid readily absorbs radiation from the heat source if it is tuned to the absorber fluid absorption spectrum, leading to fusion of the defined cross-section.

Using such a tuned heat source for the calibration process poses several problems. The rate of heating by the lamp has to be reduced significantly and the heat source passed repeatedly over the build bed surface to suitably reduce the rate of heating to allow a detectable onset of fusion. This leads to intermittent heating steps and the rate of heating has to be smoothed to detect the onset of fusion. In addition, a temperature sensor is typically located above the build bed surface and thus the area to be monitored is repeatedly obscured by the passing heat source, meaning that the onset of fusion will most likely be obscured by the heat source as it passes.

Most apparatus will further comprise a static overhead heater that is non-selective and provides preheating to the entire layer of particulate material. With such a heat source the heating process is less efficient and to reach fusion, the areas not to be fused also receive significant heat, which is likely to result in a decay of material properties and low recyclability. Calibration procedures that effectively and accurately detect the onset of fusion of the particulate material are therefore needed to address the aforementioned problems.

SUMMARY

Aspects of the invention are set out in the appended independent claims, while particular embodiments of the invention are set out in the appended dependent claims.

The following disclosure describes, in one aspect, a method for determining a set point for measurements from a temperature sensor of an apparatus for the layer-by-layer formation of a three-dimensional object from particulate material, the apparatus having a moveable heat source, the method comprising:
  (a) distributing a calibration layer of particulate material over a build bed surface;
  (b) selectively applying absorption-modifying fluid to a reference area or to an area surrounding a reference area, on the build bed surface;
  (c) lowering the build bed surface to a calibration depth, wherein the moveable heat source is moveable across the build bed surface, and wherein the calibration depth defines a calibration distance D between the moveable heat source and the build bed surface greater than a build depth at which the object is built;
  (d) applying heat to the reference area using the moveable heat source while measuring, using the temperature sensor, the temperature increase of a sub-reference area comprised within the reference area over a duration of time, at least until the particulate material of the reference area begins to fuse; and/or taking optical readings, using an optical sensor, of an optical property of the sub-reference area over the duration of time;
  (e) determining the onset of fusion of the particulate material from the measured temperature increase and/or from a change in the optical property over the duration of time of the reference area; and
  (f) applying the onset of fusion as the set point for subsequent temperature measurements of the temperature sensor.

According to another aspect of the disclosure, there is provided a method for calibrating the measurement of a temperature sensor of an apparatus for the layer-by-layer formation of a three-dimensional object from particulate material, the method comprising:

(a) distributing a base layer of particulate material to form the build bed surface;

(b) applying radiation-absorbing fluid to a base reference area comprised in the base layer;

(c) fusing the particulate material of the base reference area using a heat source to form a fused base reference area;

(d) distributing a layer of particulate material over the base layer to form the build bed surface, including a reference area coincident with the base reference area;

(e) lowering the build bed surface to a calibration depth, the calibration depth defining a calibration distance D between a moveable heat source and the build bed surface that is greater than a build depth at which the object is built;

(f) operating the moveable heat source above the build bed surface to apply heat to the build bed surface while measuring, using the temperature sensor, the temperature increase of a sub-reference area comprised within the reference area over time, at least until the particulate material of the sub-reference area begins to fuse, and/or taking optical readings, using an optical sensor, of an optical property of the sub-reference area over the duration of time;

(g) determining the onset of fusion of the particulate material from the measured temperature increase over time across the sub-reference area, or where an optical sensor is used in step (f), determining the onset of fusion from the optical readings; and (h) applying the onset of fusion as determined in step (g) as a set point for subsequent temperature measurements of the temperature sensor.

A controller arranged to carry out such methods is also provided.

According to a further aspect of the disclosure, there is provided a controller configured to carry out a calibration routine based on the onset of fusion of particulate material, for an apparatus for the manufacture of a three-dimensional object by layer-by-layer deposition of particulate material over the surface of a build bed, the controller being configured to:

(a) receive data defining a reference area, within the build bed surface, of unfused particulate material;

(b) control a distributor to distribute a calibration layer of particulate material over the build bed to form the build bed surface;

(c) control a build bed height controller to lower the build bed surface to a calibration depth greater than a build depth at which the object is built;

(d) control a moveable heat source, moveable across the build bed surface, to heat the reference area for a duration of time at least until a sub-reference area comprised within the reference area begins to fuse;

(e) over the duration of time, receive temperature measurements of the sub-reference area from a temperature sensor, and/or receive optical readings of an optical property from an optical sensor of the sub-reference area;

(f) determine from the temperature measurements or the optical readings taken over the duration of time the onset of fusion; and (g) apply the onset of fusion as the set point for subsequent temperature measurements of the temperature sensor.

BRIEF DESCRIPTION OF THE DRAWINGS

Reference is now directed to the drawings, in which.

In the Figures, like elements are indicated by like reference numerals throughout.

DETAILED DESCRIPTION

Figure 1:
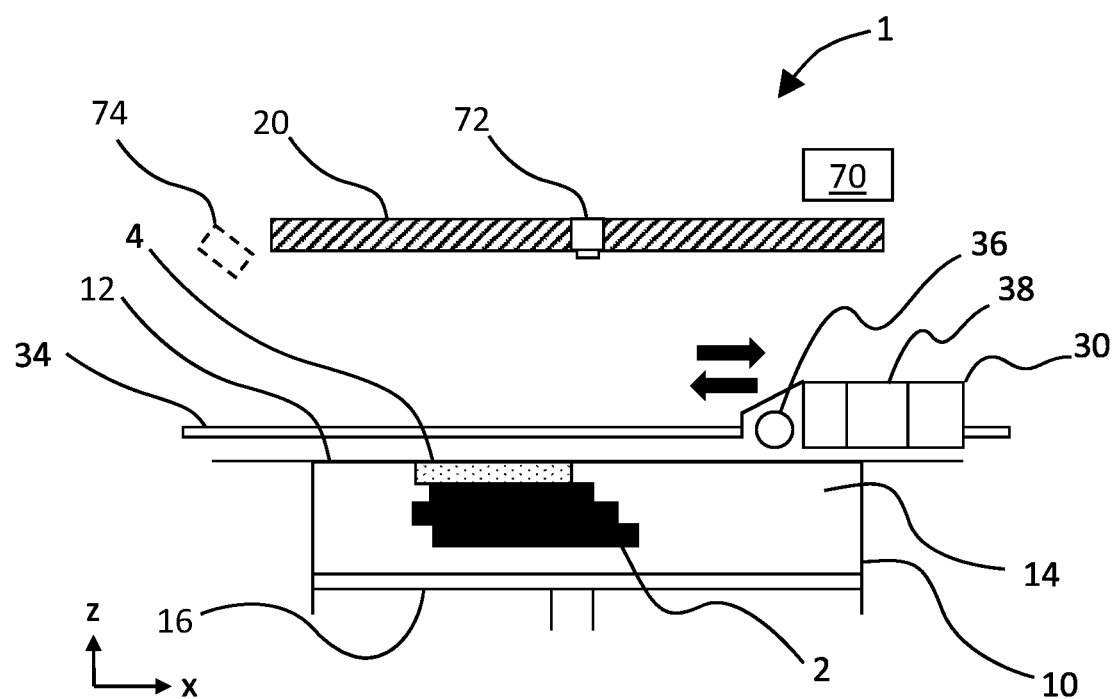
FIG. 1 is a schematic cross-section of an apparatus for the layer-by-layer formation of three-dimensional objects configured to apply calibration routines according to embodiments of the invention.

FIG. 1 illustrates a schematic cross-sectional front view of a typical print and sinter apparatus that will be used to describe the improved calibration methods according to embodiments of the invention, and their associated apparatus and controllers.

In a typical process for the generation of a three-dimensional object 2 from particulate material, successive layers of particulate material are distributed to form the build bed surface 12 which is processed to form successive cross-sections of the object 2. The apparatus 1 comprises a powder container system which comprises a build bed 14 supported by container walls 10 and a build bed floor 16, and comprising the formed object 2. The build bed floor 16 is arranged to move vertically within the container wall 10 to lower or raise the build bed surface 12; for example it may be moved up and down by a piston located beneath the build bed floor.

A carriage 30 is movably arranged on one or more rails 34 to allow it to be moved back and forth across the build bed surface 12. The carriage 30 may comprise a printing module 38 for selectively depositing absorption-modifying fluid across the build bed surface 12; and a heat source module 50 (not shown in FIG. 1). The same or a different carriage (not shown) may comprise a distributor module for distributing the particulate material across the build bed 14. A powder dosing module arranged to dose fresh powder to be distributed is also present but not specifically shown. The same or a different carriage 30 may further support a moveable heat source 36.

In a typical build sequence of an object cross-section, the build bed floor 16 is lowered by a layer thickness and a dose of particulate material is distributed across the build bed surface 12. Printheads of the fluid deposition module 38 deposit fluid, for example containing radiation-absorbing material such as carbon black, at selected locations defined by the cross-section of the object to be formed within the specific layer of distributed powder. After this, the moveable heat source, for example an infrared lamp spanning the width of the build bed surface 12, supported on a carriage 30, is passed across the build bed surface 12 to selectively heat and consolidate the powder that has received the radiation-absorbing fluid. In FIG. 1, this is the defined area 4 defined by the radiation-absorbing fluid and that is to be fused.

In this illustrative process, the steps of lowering the build bed floor, distributing particulate material to form a new layer, printing and fusing the defined area 4 happen sequentially. Depending on the number of carriages and the modules they support, suitable sequences of travel of the carriages may be applied to support the steps of layer formation and selective consolidation. An overhead heater 20 may be provided in the apparatus 1 to preheat the build bed surface 12 and to maintain the build bed surface at a preset temperature below the onset of fusion. The heater may be operated at least partially based on temperature measurements of a sensor 72 monitoring the temperature of part or all of the build bed surface. The sensor 72 may be located within the area of the heater 20, as is shown for the illustrative apparatus 1 of FIG. 1.

The particulate material may be a polymeric material such as nylon PA11, a bioplastic polyamide powder. During build procedures, the level of measurements of the sensor may change, for example due to contamination of a protective window protecting the sensor from the environment of the working space, or due to the temperature of the sensor environment; or the properties of the build material may change due to thermal cycling or provision of a new composition of particulate material. The sensor's relative scale of temperature may be calibrated against the onset of fusion as determined from the temperature-time characteristics of the particulate material. The relative scale may in addition be set to an absolute scale if the onset of fusion as determined with the sensor is provided with an absolute value measured separately.

The apparatus 1 is suitable to carry out any improved calibration routines based on determination of the onset of fusion from measured temperature-time characteristics, as will now be described with reference to FIGS. 2 to 10.

First Embodiment and Variants Thereof

In order to overcome or reduce the above problems, improved calibration routines are provided that determine the onset of fusion from measurements of the temperature of a reference area at least until it begins to fuse, with improved accuracy. In several variants of a first embodiment the calibration routines employ at least one reference area comprising radiation absorber while reducing the rate at which the reference area is heated, using conventional apparatus configured to carry out the corresponding configurations of the calibration routines. This may be achieved in several ways; for example, where a heat source having a radiation spectrum that is preferentially absorbed by the radiation-absorbing material is used, the procedure of a normal build process may be adapted to address the problems by, in one implementation, increasing the distance between the moveable heat source and the build bed surface (and thus reference area) so as to reduce the intensity of radiation that impacts the build bed surface. For example, the build bed may be lowered during the calibration routine, such as by operating a piston supporting the build bed floor and arranged to lower or raise it.

In another variant, the reference area is irradiated by a fixed overhead heater. In yet another variant, the moveable heat source may be repeatedly passed over the build bed surface so as to gradually provide sufficient energy to the reference area that the particulate material of the reference area fuses. In addition, the distance of the lamp with respect to the build bed surface may be improved for better accuracy of measurement; the duty cycle of the heat source for achieving fusing of an object build layer and/or the speed of travel of the heat source and/or the amount of radiation absorber per unit area in the reference area may be adjusted so as to further modify the time before fusion is achieved. Such an improved process may however still require a degree of extrapolation of the time-temperature data to account for the repeated passes of the heat source during which the reference area is cyclically heated. Furthermore, the measurements of the temperature sensor that is typically arranged in a fixed position above the build bed surface need to be adapted for the moving heat source intermittently obstructing the field of view.

The first embodiment will now be described in detail with reference to FIGS. 2A to 2D, 3 4 and 6, and their corresponding variants.

First Variant

Figure 2A:
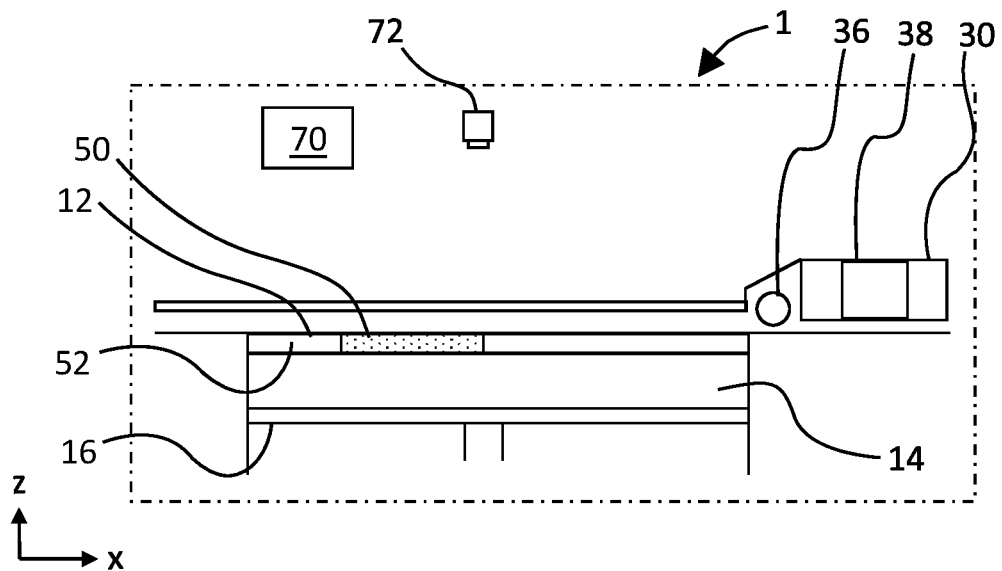
FIGS. 2A to 2C are schematic cross-sections of the apparatus carrying out steps of a first variant of the routine according to a first embodiment.
Figure 2B:
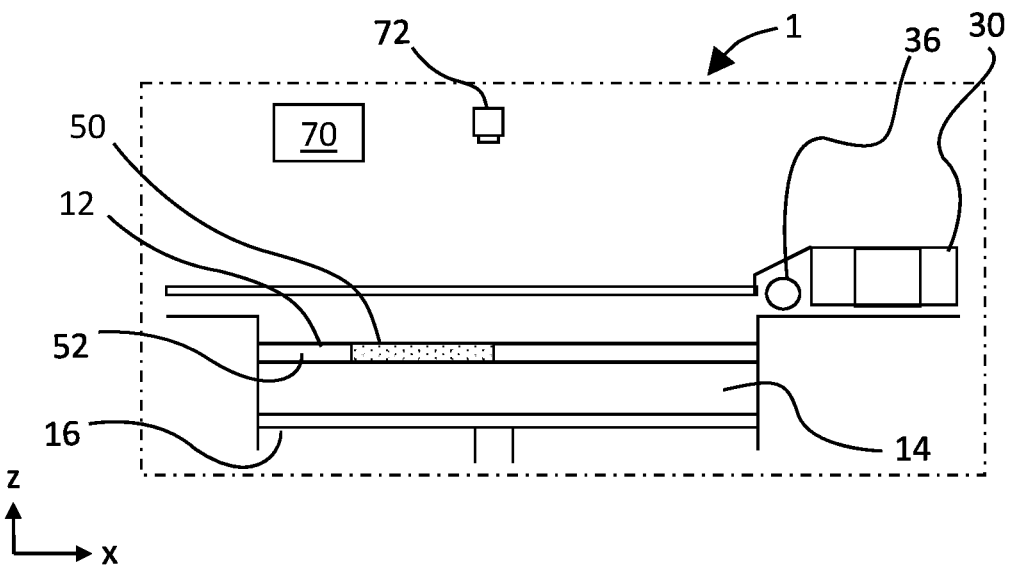
Figure 2C:
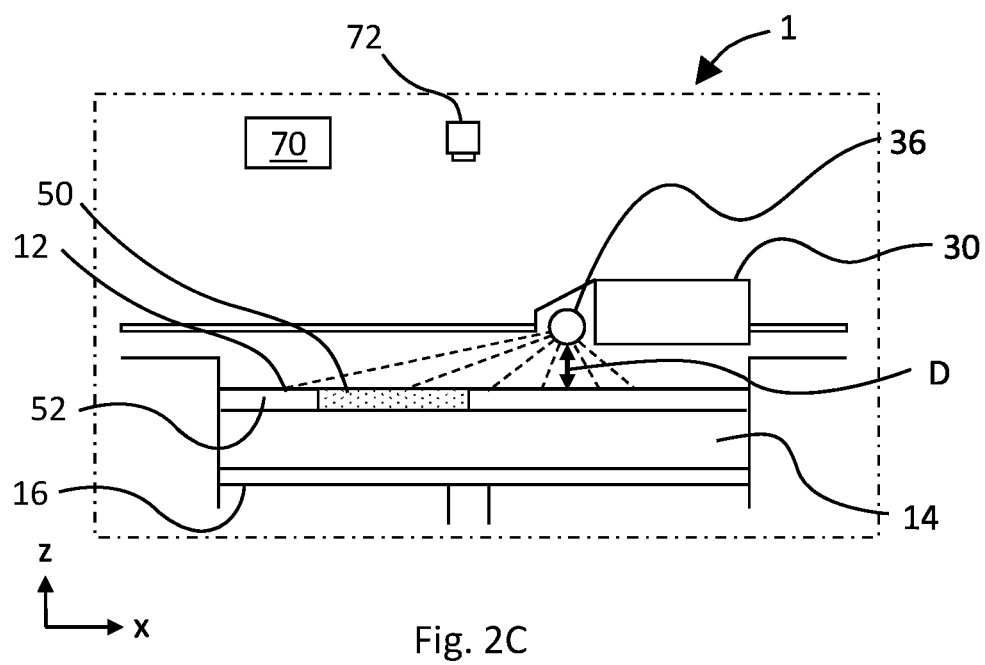
Figure 2D:
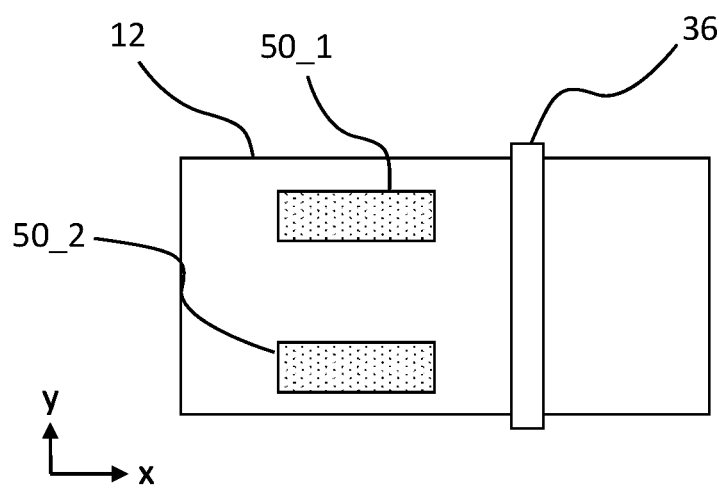
FIG. 2D is a plan view of the build bed of FIG. 2A illustrating more than one reference area.

FIGS. 2A to 2C are schematic views of a cross-section through an apparatus 1 (substantially as previously described with reference to FIG. 1) configured to carry out the calibration routine. FIG. 2D is a plan view of the build bed surface 12 of FIG. 2A. FIG. 2A shows a cross-section through the build bed 14 having a build bed floor 16 that may be lowered for a new layer to be distributed across the build bed surface during a normal build procedure. For the calibration routine steps illustrated in FIGS. 2A-2D, the build bed floor 16 may further be lowered by a larger distance than a layer, so as to increase the distance between the build bed surface 12 and the heat source 36 mounted on the moveable carriage 30.

FIG. 2A shows a calibration layer 52 that has been distributed across the build bed 14 to form the build bed surface 12. The moveable printing module 38, which is provided on the carriage 30 and moveable back and forth across the build bed surface 12 along a process direction x, is arranged to define a reference area 50 by selectively depositing a radiation-absorbing fluid over the reference area 50. The carriage 30 supporting the heat source 36 is moveable back and forth across the build bed surface 12 along the process direction x.

Next, the build bed floor 16 is lowered to move the build bed surface 12 to a calibration depth. This is shown in FIG. 2B. The carriage 30 is next moved to locate the heat source 36 at a calibration position. FIG. 2C shows the heat source 36 in the calibration position, and further illustrates that the lowering of the build bed floor 12 by a calibration depth defines a calibration distance D between the build bed surface 12 and the heat source 36. The calibration distance D is a distance that is greater than a normal build process distance between the moveable heat source 36 used to fuse the particulate material and the build bed surface 12 when an object is being built, and is the minimum distance between the heat source 36 and the build bed surface 12. The calibration distance D may be determined so as to sufficiently reduce the heat impact of the heat source on the build bed surface 12, to prevent particulate material from densifying or fusing in regions other than the reference area 50. It should be noted that the order of steps of lowering the build bed surface to the calibration depth and of moving the moveable heat source to the calibration position is interchangeable.

Figure 6:
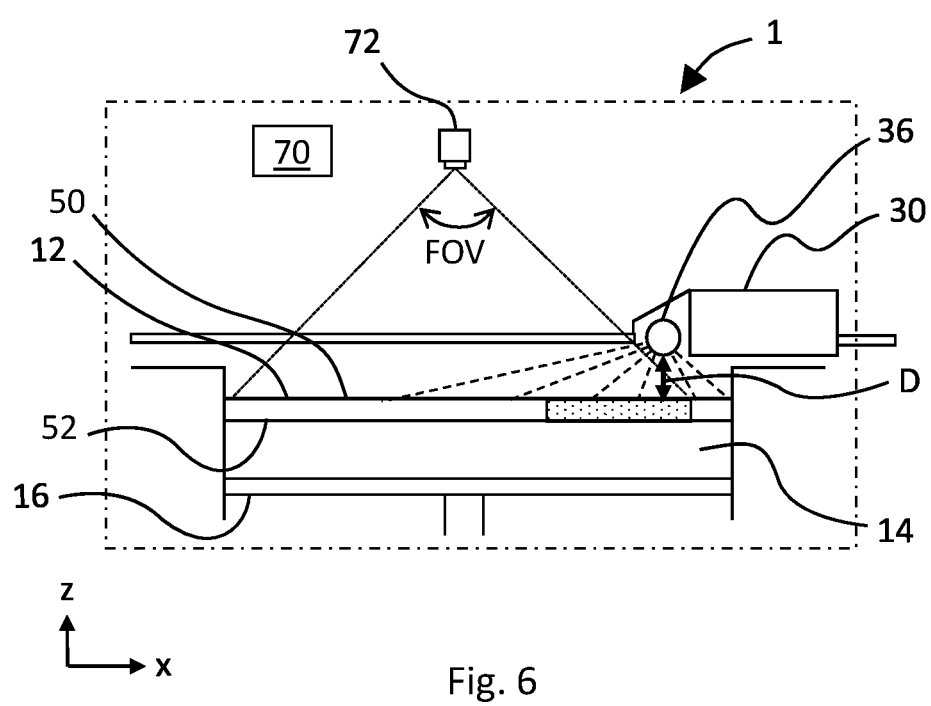
FIG. 6 is a schematic cross-section of the apparatus of FIG. 2C for a different reference area location.

Next, the heat source 36 is operated to heat the reference area 50 at least until the material of the reference area begins to fuse. Meanwhile, a temperature sensor 72, such as an infrared camera, positioned above the build bed surface 12, is configured to monitor the temperature of the reference area 50 as it is being heated. The sensor may be mounted in a fixed position, and the calibration position of the heat source 36 and/or the calibration distance D are chosen so as not to obstruct the reference area 50 from the field of view of the sensor 72. This is illustrated in FIG. 6, in which the sensor 72 is centrally mounted above the build bed surface 12, and above the moving envelope of the moveable heat source 36. The calibration position and the calibration distance D are chosen such that the field of view (FOV) of the sensor encompasses a "direct sub-reference area" directly underneath the heat source 36, where the direct sub-reference area is comprised within the reference area 50. In the apparatus shown, the calibration position is near one end of the build bed surface 12. Other calibration positions may be possible depending on the arrangement and design of the carriage and the moveable heat source. In some implementations, the sensor 72 may be moveable.

The moveable heat source 36 positioned in the fixed calibration position can continuously provide energy to the reference area 50 without interrupting the heating process of the reference area 50, and the time-temperature behaviour from the sensor measurements do not have to be smoothed to compensate for the effects of intermittent heating or any other effects due to a passing heat source. Thus the sensor measurements over the duration of the calibration routine can be used to accurately determine the onset of fusion over the reference area 50.

The rate of heating of the reference area 50 may be reduced and the accuracy of determining the onset of fusion may be improved suitably by adjusting the calibration distance D in the vertical direction (along z). Additionally, the distance between the heat source 36 and the reference area 50 in the lateral direction (along x) may be adjusted, and/or the power output of the heat source 36. This variant of the first embodiment provides several parameters that allow tuning the calibration procedure to achieve the desired accuracy. The rate of heating may be controlled by one or more of the following:

The duty cycle of the heat source, which, compared to a normal build process for which the fusing heat source is operated at or near 100% duty cycle, may be reduced to 50% or less, or 17% or less, or 10% or less, for a 3 kW near infrared heat source. In other words, the power output of the heat source may respectively be 1.5 kW or less, 500 Watts or less, or 300 Watts or less. The duty cycle may be increased from 0% to 10% during the heating of the reference area, i.e. to 300 Watts.

The build bed surface 12 may be lowered to increase the distance between the heat source and the reference area 50, for example between 60 mm to 120 mm from the axial centre of the elongate heat source to the build bed surface.

The amount of radiation-absorbing fluid deposited over the reference area may be reduced to reduce the amount of heat absorbed by the heat source.

The heat source 36 in FIGS. 2A, 2B and 2C is elongate and spans the width of the build bed surface 12, so that the reference area 50 receives substantially the same level of heating from the heat source 36 along a line of constant distance to the heat source 36. The reference area 50 may extend sufficiently along the process direction x so that sub areas of the reference area 50 closest to the heat source 36 will fuse first and sub areas furthest away will fuse last, allowing a progressive onset of fusion to be monitored against distance of sub areas of the reference area from the heat source 36.

FIG. 2D indicates that more than one reference area may be defined and fused in the same calibration routine while the sensor monitors the temperature of all the defined reference areas; in this case reference areas 50_1 and 50_2. The reference areas may be arranged near the edges of the build bed or at regular intervals covering part or all of the build bed width along the direction of elongation of the heat source 36.

The sensor measurements are used to determine the onset of fusion in the reference areas 50, using the characteristic change in the rate of heating that indicates the onset of fusion. The onset of fusion is an important set point for the build process to the particulate material and may be used to calibrate the temperature measurements of the temperature sensor that is to be used for subsequent build processes.

Second Variant

Figure 3:
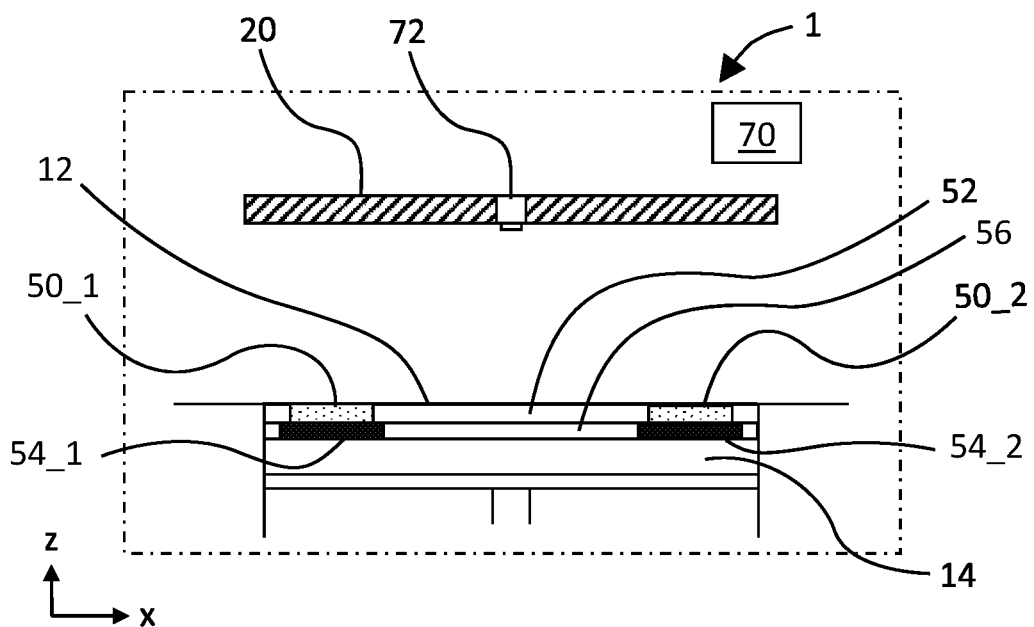
FIG. 3 is a schematic cross-section of the apparatus carrying out a step of a second variant of the routine according to the first embodiment.

FIG. 3 illustrates a second variant of the above embodiment of FIGS. 2A-2D. In this variant, the reference layers 50_1 and 50_2 have been defined with radiation-absorbing material within the build bed surface 12. Instead of the moveable heat source 36 of FIG. 2A and 2B located at a fixed calibration position during the calibration routine, in FIG. 3 a fixed overhead heater 20 is the heat source operated to heat the reference areas. The carriage 30 is not shown in this Figure as it has been moved out of the field of view of the overhead heater 20 above the build bed surface. The reference areas 50_1 and 50_2 can thus be heated and monitored in an unobstructed manner by the overhead heater 20 and by the fixed temperature sensor 72.

Where the fluid deposited to define the reference areas 50 comprises radiation absorber and the particulate material in regions surrounding the references areas does not comprise absorber, the calibration layer 52 may be supported on a base layer 56 of particulate material comprising one or more base reference areas 54. FIG. 3 shows two base reference areas 54_1, 54_2 that have been fused after being defined by depositing radiation-absorbing material over them and fusing them, for example by passing a moveable heat source (not shown but analogous to heat source 36 in FIG. 2A, for example) over the build bed surface 12 to apply heat to the base reference areas 54_1, 54_2. After this, the calibration layer 52 is distributed over the base layer 56 to form the build bed surface 12. In cases where the radiation emitted by the overhead heater 20 is not selective and thus may be slow to heat the reference area 50, the fused base reference areas 54_1, 54_2 may be used to raise the base temperature of the reference areas 50_1, 50_2 at the beginning of the heating step, to reduce the temperature difference to the onset of fusion. The method may be further optimised by adjusting the amount of radiation-absorbing fluid that is deposited per unit area over the base reference area with respect to the reference area(s). The amount of radiation-absorbing fluid deposited per unit area over the reference area 50 may for example be lower than that used to fuse the base reference area 54, so as to reduce the rate of heating and improve accuracy of detection of the onset of fusion of the reference area.

In the second variant of FIG. 3, the sensor 72 is fixedly located within the area of the overhead heater 20. The overhead heater 20 may comprise individually controllable heating elements arranged in a regular or irregular array over the heater area. While the overhead heater 20 applies radiation to the build bed surface 12 during the calibration routine, the area surrounding the reference areas heats up more slowly than the reference areas 50_1, 50_2, and the reference areas 50_1, 50_2 are fused before the area surrounding the reference areas.

Third Variant

Figure 4:
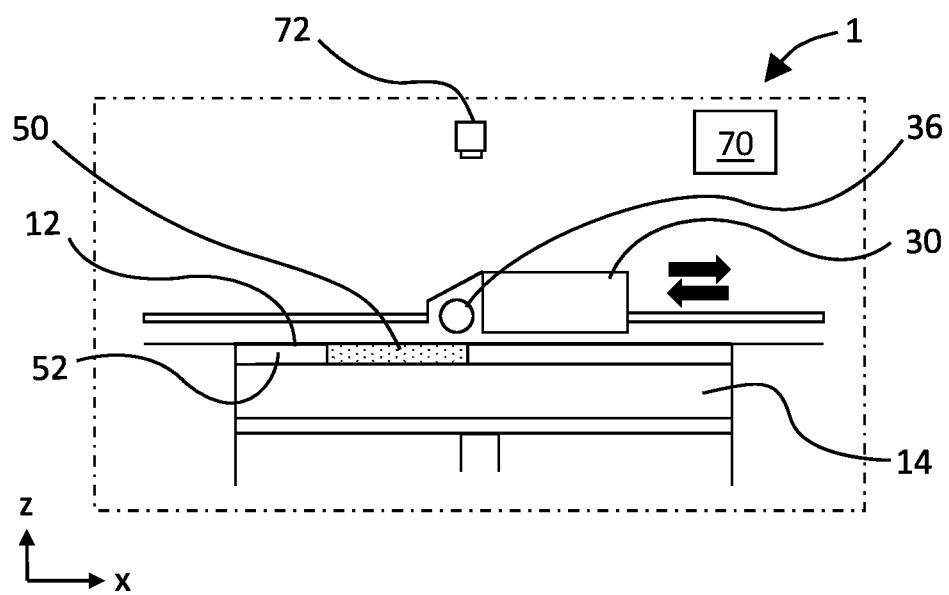
FIG. 4 is a schematic cross-section of the apparatus carrying out a step of a third variant of the routine according to the first embodiment.

FIG. 4 illustrates a third variant of the first embodiment that may be used to carry out an improved calibration routine. Unlike the first two variants, this variant uses a moving heat source 36 to achieve fusion in the reference layer 50. As before, the reference layer 50 is defined by depositing absorber such that, during irradiation by the moving heat source 36, the reference area 50 absorbs heat faster than the surrounding area.

The heat source is mounted to a movable carriage 30 arranged to move back and forth across the build bed surface 12, and may be one or the same that, during a normal build process, carries out the fusing step of the cross-sections of the object, or it may be a preheat lamp used to preheat a newly deposited layer of powder before and/or after the deposition of modifying fluid, such as absorber fluid, and before the fusing step, but operated at a different power to achieve fusion.

In this variant, the time to fusion may be controlled by one or more of the following:

The duty cycle of the heat source, which, compared to a normal build process for which the fusing heat source is operated at or near 100% duty cycle, may be 50% or less, or 17% or less, or 10% or less, for a 3 kW heat source. In other words, the power output of the lamp may be 1.5 kW or less, 500 Watts or less, or 300 Watts or less.

The build bed surface 12 may be lowered to increase the distance between the heat source and the reference area 50.

The amount of radiation-absorbing fluid deposited over the reference area may be reduced to reduce the amount of heat absorbed by the heat source.

The speed at which the heat source passes over the reference area may be adjusted, for example it may be increased to reduce the amount of heat received by the reference area.

In the variant in FIG. 4, the heat source 36 is mounted in a preferable position so that it extends along one end of the carriage 30. In some apparatus the end of the carriage extends along the width of the build bed surface. Depending on the direction of travel across the build bed surface 12 (as indicated by the arrows in FIG. 4) the heat source 36 extends along the leading or trailing end of the carriage 30. The effect of the periodic obstruction of the field of view of the sensor 72 located above the build bed surface 12 and above the heat source 36 is that the onset of fusion is obstructed from the sensor's view by the heat source at least. Thus only an indirect detection is possible by extrapolation of the measured temperatures. The field of view may be improved by increasing the distance between the heat source and the build bed surface.

In some implementations, this distance may be adjusted dynamically in synchronisation with the movement of the heat source, while adjusting the power output of the heat source dynamically to achieve a consistent heating effect by the heat source (e.g. the larger the distance between the heat source and the build bed surface, the higher the duty cycle). In this arrangement using a moving heat source 36, multiple reference areas 50_n located at different locations across the build bed surface may be heated and measured in a relatively quick procedure (in comparison to multiple procedures necessary to capture similar locations when involving a moveable heat source in a fixed calibration position).

In the above variants, the calibration procedure is stopped once the reference area(s) 50 (or the direct sub-reference areas comprised within the reference area(s)) have begun to fuse, or soon after. In any case it desirable to discontinue the calibration routine before the area surrounding the reference areas fuse.

In the described variants of FIGS. 2A to 2D, 3, 4 and 6, different combinations of radiation spectra and absorptive properties of the calibration layer and of the reference area 50 may be suitable. For example, the selectivity of the particulate material to a particular radiation spectrum may be achieved by depositing onto the calibration layer a radiation-absorbing fluid to define the reference area 50. During the calibration routine, the radiation spectrum of the heat source 36 is chosen so that it is preferentially absorbed by the radiation-absorbing fluid. The reference area 50 thus heats up more rapidly than the area surrounding the reference area 50 and fuses ahead of the surrounding area.

Alternatively, the particulate material may comprise radiation-absorbing material that preferentially absorbs radiation from the spectrum of the heat source, and the fluid that is deposited inhibits absorption of the radiation spectrum emitted by the heat source. Such an absorption inhibitor may be deposited over the area surrounding the reference area 50, so that the reference area 50 heats up more rapidly than the area surrounding the reference area 50 and fuses ahead of the surrounding area. Thus, generally, different combinations of absorption-modifying fluid providing selectivity to absorption of radiation over certain areas of the build bed surface 12 and the absorptive properties of the particulate material may be chosen, and for these the hereindescribed calibration procedures are equally applicable.

While the variants herein are illustrated using a temperature sensor to determine the onset of fusion, an optical sensor 74 as shown in FIG. 1 may instead be used to detect the onset of fusion, or any sensor arranged to detect a characteristic change in properties of at least part of the reference area that indicates the onset of fusion. The onset thus detected may then be used to calibrate the temperature scale of a temperature sensor in the apparatus to the onset of fusion, so that subsequent processes may be carried out using a temperature sensor calibrated to the onset of fusion of the particulate material.

Therefore, a method for determining a set point for measurements from a temperature sensor 72 of an apparatus for the layer-by-layer formation of a three-dimensional object from particulate material is provided, the method comprising:

(a) distributing a calibration layer of particulate material over a build bed 14 to form a build bed surface 12;
(b) selectively applying absorption-modifying fluid to a reference area 50 or to an area surrounding a reference area, on the build bed surface 12;
(c) applying heat to the reference area 50 using a heat source 36 and/or 20 while measuring, using the temperature sensor 72, the temperature increase of the reference area 50 (or a sub-reference area thereof) over a duration of time, and/or taking optical readings, using an optical sensor 74, of an optical property of the reference area (or a sub-reference area thereof) over the duration of time; at least until the particulate material of the reference area 50 (or the sub-reference area thereof) begins to fuse; and
(d) determining the onset of fusion of the particulate material from the measured temperature increase and/or from a change in the optical property from the sensor readings, over the duration of time of the reference area 50 (or the sub-reference area thereof); and
(e) applying the onset of fusion as the set point for subsequent temperature measurements of the temperature sensor 72.

The expression "absorption-modifying fluid" refers to fluids that, when applied to particulate material, modify the absorption of radiation from the heat source by the particulate material, and thus the rate of heat absorption and fusion. For example, the absorption-modifying fluid may be a radiation-absorbing fluid that promotes the absorption of heat by the particulate material when exposed to radiation of the heat source. Alternatively, the absorption-modifying fluid may be an absorption-inhibiting fluid, which inhibits the absorption of heat by the particulate material when exposed to radiation of the heat source.

The heat source may for example be located over the build bed surface 12, at a fixed or non-fixed position. For example, in some variants such as those described with respect to FIGS. 2A-2D, FIG. 4 and FIG. 6, the heat source is a moveable heat source 36. When using a heat source 36 moveable across the build bed surface 12 to heat the reference area 50, the step of applying heat to the reference area 50 may be preceded by a step of lowering the build bed surface 12 by a calibration depth. The calibration depth defines a calibration distance D between the moveable heat source 36 and the build bed surface 12 that is greater than a build distance at which the object is being built in a normal operational state of the apparatus during which an object is formed across the build bed surface. The calibration distance may be greater than 5 mm. By setting the calibration depth to the calibration distance, the energy of the moveable heat source at the build bed surface is reduced compared to the normal operating distance. Depending on other properties used to lower the energy at the build bed surface, and at the reference area, such as reducing the power of the heat source by adjusting the duty cycle, or by adjusting (reducing) the amount of radiation absorber provided to the reference area for example, the calibration distance may be up to 120 mm. The calibration distance is the minimum distance between the heat source 36 and the build bed surface 12. Preferably, the calibration distance D may be between 5 mm and 90 mm, or 5 mm and 80 mm, or between 5 mm and 50 mm, or between 5 mm and 15 mm.

Optionally, as for example described for the calibration routine illustrated in FIGS. 2A-2D, after the step of lowering the build bed surface 12 and before the step of applying heat to the reference area 50, the moveable heat source 36 may be moved to a calibration position and remain stationary for the duration of the steps of applying heat to the reference area 50 and measuring, using the temperature sensor 72, the temperature increase of the reference area 50 (and/or when using the optical sensor 74, taking readings in respect of the surface of the reference area) over the duration of time. In such a variant, the field of view of the sensor 72 arranged to monitor the reference area 50 is not obstructed by the heat source 36 during the step of heating, and the onset of fusion may thus be accurately captured by the sensor 72. This provides improved accuracy of determining the onset of fusion compared to using a moving heat source. For example, the moveable heat source 36 may be located off to one side of the reference area 50, or the moveable heat source 36 may be located in a calibration position with the build bed surface at a calibration depth defining a calibration distance D that, in combination, allow the sensor 72 to continuously view a direct sub-reference area of the reference area 50 that is located substantially directly underneath the moveable heat source.

In some apparatus, where the sensor is located centrally above the build bed surface, the calibration position of the moveable heat source may be near an end of the build bed surface.

In some variants, such as the one described with reference to FIG. 4, instead of being moved to a calibration position, for the duration of the steps of applying heat to the reference area 50 and measuring, using the temperature sensor 72, the temperature increase of the reference area 50 over time (and/or when using the optical sensor 74, taking optical readings in respect of the surface of the reference area), the moveable heat source 36 may repeatedly be moved across the reference area 50 to apply heat to the reference area. The sensor may be located fixedly above the build bed surface 12 and the distance between the build bed surface and the moveable heat source 36 may be adjusted to a calibration distance D by lowering the build bed surface 12 by a calibration depth. The calibration distance D may remain constant for the duration of the heating step. In other implementations of this variant, the calibration distance D may be adjusted dynamically as the moveable heat source moves across the reference area. In other words, the calibration depth D is adjusted synchronously with the motion of the moveable heat source. This may improve the instances over which the sensor's field of view encompasses the direct sub-reference area located substantially directly underneath the moving heat source, where the direct sub-reference area is comprised within the reference area 50. Calibration depth adjustments may be based on position information of the heat source 36 over the build bed surface, for example from the carriage encoder.

A dynamic adjustment of the calibration distance may in turn be synchronised to a dynamic adjustment of the power output of the heat source 36. Specific combinations of calibration depth and power output may both be based on encoder position information.

The heat source 36 may be an elongate heat source spanning the length of the end of the carriage 30, and/or spanning the width of the build bed surface 12. Furthermore, the heat source 36 may be a near-infrared lamp, and one of the absorption-modifying fluid and the particulate material may comprise a near-infrared radiation-absorbing material. Alternatively, the particulate material may comprise radiation-absorbing material and the absorption-modifying fluid may comprise absorption-inhibiting material that is applied to the area surrounding the reference area so as to inhibit fusion of the particulate material upon heating.

In variants such as the one illustrated in FIG. 3, instead of using a moveable heat source 36 to apply heat to the reference area 50, the heat source may be an overhead heater 20 fixedly located above the reference area 50.

In some of the above variants, a further level of control over the rate of heating may be provided by first distributing a base layer 56 of particulate material before distributing the calibration layer 52. Before distributing the calibration layer 52, the base layer 56 may be modified by defining and fusing a base reference area 54 comprised on the base layer 56.

The reference area 50 may overlap with or be coincident with the fused base reference area 54. This may provide an elevated base temperature to the reference area 50 of the calibration layer 52.

In such variants, both the reference area 50 and the base reference area 54 are provided with radiation-absorbing fluid in the case where the particulate material does not comprise radiation absorber.

Therefore, optionally, in some variants in which the absorption-modifying fluid is radiation-absorbing fluid that has been deposited over the reference area 50, before the step of distributing the calibration layer 52, the method further comprises the steps of: distributing a base layer 56 of particulate material over the build bed to form the build bed surface 12; applying radiation-absorbing fluid to the base reference area 54, wherein the base reference area 54 overlaps at least partially with the reference area 50, and fusing the base reference area 54, using a heat source 20, 36, before the calibration layer 52 is distributed. The heat source 36, 20 may be the same heat source 36, 20 that is used for fusing the reference area 50, or it may be a different heat source. The amount of radiation-absorbing fluid per unit area applied to the reference area 50 may be different to the amount of radiation-absorbing fluid per unit area applied to the base reference area 54 so as to modify the amount of heating of the reference area 50. For example, by reducing the amount of absorber content in the base reference area 54 compared to the reference area 50, the effect of heating of the reference area provided by the base reference area 54 may be reduced. In this way the impact of the radiation spectrum of the heat source 36, 20 may be tuned to the rate of heating required for accurate determination of the onset of fusion.

The method steps may be carried out by the apparatus 1 as described in the Figures and comprising a controller 70 configured to determine the onset of fusion of the particulate material from the measured temperature increase over time of the reference area 50 (and/or when using the optical sensor 74, from readings by the sensor of an optical property of the surface of the reference area); and to optionally apply the onset of fusion as a set point for the temperature measurements of the temperature sensor 72.

The controller 70 may further be configured to control the heat source 36, 20 so as to initiate the step of heating the reference area 50. The controller 70 may further be configured to control the temperature sensor 72 to initiate the step of monitoring the temperature of the reference area 50 and to provide temperature measurements by the sensor 72 to the controller 70 (and/or to control an optical sensor 74 to initiate the step of taking readings of the surface of the reference area and to provide the reading to the controller 70). Furthermore, the controller 70 may be configured to control the build floor depth so as to lower the build floor to the calibration depth, and to control the position of the moveable heat source 36, for example by controlling the position of the carriage 30 supporting the heat source 36, for example to move the moveable heat source 36 to the fixed calibration position. The controller may further be configured to control the deposition module to deposit absorption-modifying fluid over the calibration layer 52 so as to define the reference area 50. The controller may further be configured to control a distribution module to distribute a new layer (a base layer or a calibration layer) over the build bed 14.

Figure 7A:
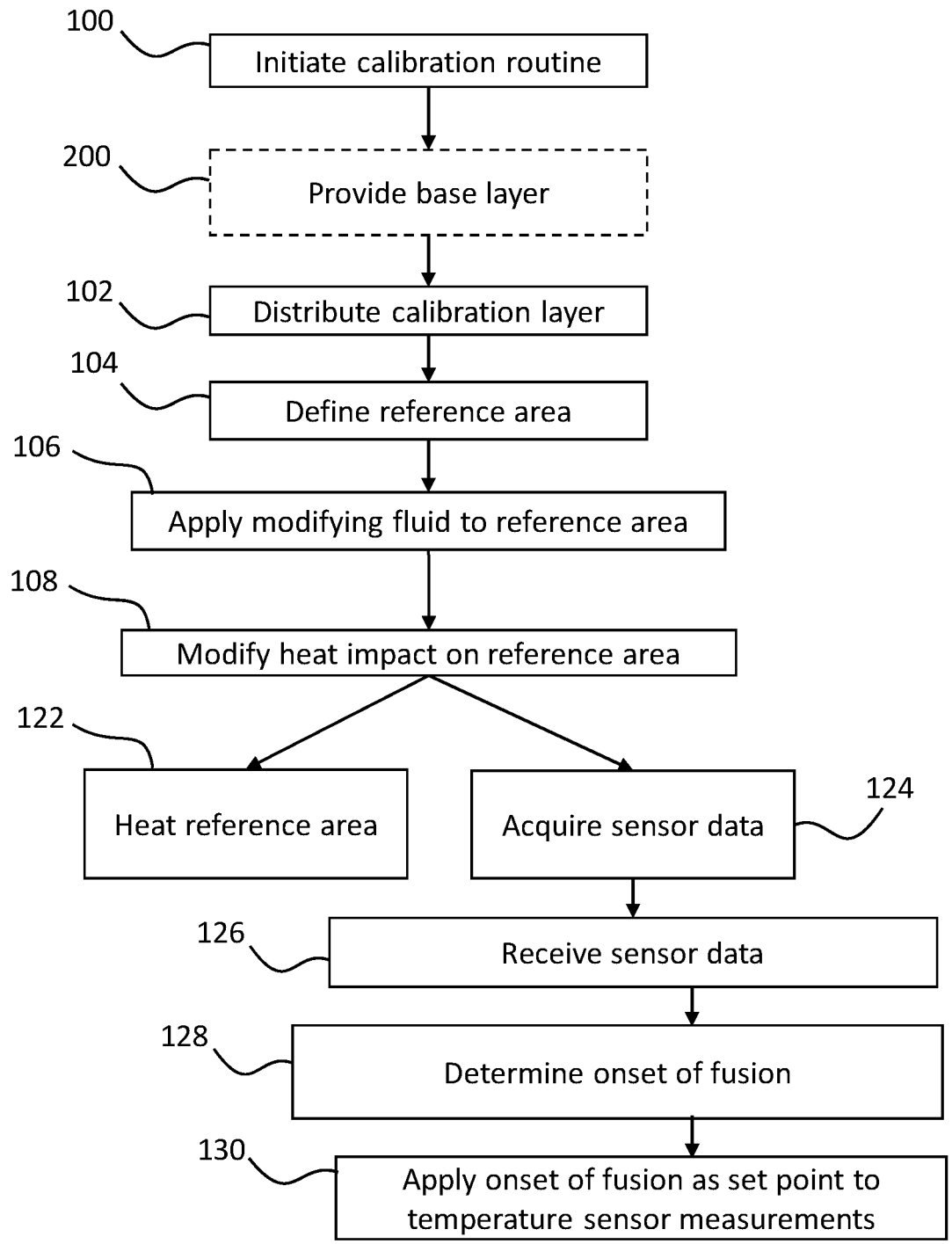
FIG. 7A is a block diagram of steps by a controller for the apparatus to control the steps of a calibration routine according to the first embodiment.

The steps carried out by the controller 70 configured to control the apparatus 1 during the calibration routine according to the first embodiment are illustrated in the block diagram of FIG. 7A. At step 100, the controller 70 is configured to initiate the calibration routine. For the variants of the first embodiment, at step 102, the controller 70 is configured to control a distribution module to distribute a calibration layer 52 across the build bed 14 to form the build bed surface 12.

At step 104, the controller 70 is configured to receive data defining the reference area 50 or a plurality of reference areas 50_n (e.g. 50_1 and 50_2).

At step 106, the controller 70 is configured to control a fluid deposition module to deposit absorption-modifying fluid selectively onto the build bed surface 12 so that only the reference area 50 is heated and such that at least a sub-reference 50A area comprised within the reference area 50 is heated to at least the onset of fusion during the heating step 122. During the step of heating the reference area, the controller is further configured at step 124 to control a sensor to monitor the reference area (or a sub-reference area comprised within the reference area) for the duration of time over which the reference area is being heated. The sensor may be a temperature sensor 72 monitoring the temperature increase of the reference area or sub-reference area, and/or or it may be an optical sensor 74 to take readings of the surface colour or reflectivity.

The absorption-modifying fluid may be radiation-absorbing fluid applied to the reference area 50, or it may be radiation-inhibiting fluid applied to the area surrounding the reference area 50 in the case where the particulate matter comprises radiation-absorbing material.

At step 108, the controller may be configured to control one or more of the build bed height, the heat source position, motion and/or duty cycle to modify the heat impact on the reference area during the step 122 of heating the reference area until it fuses.

Figure 7B:
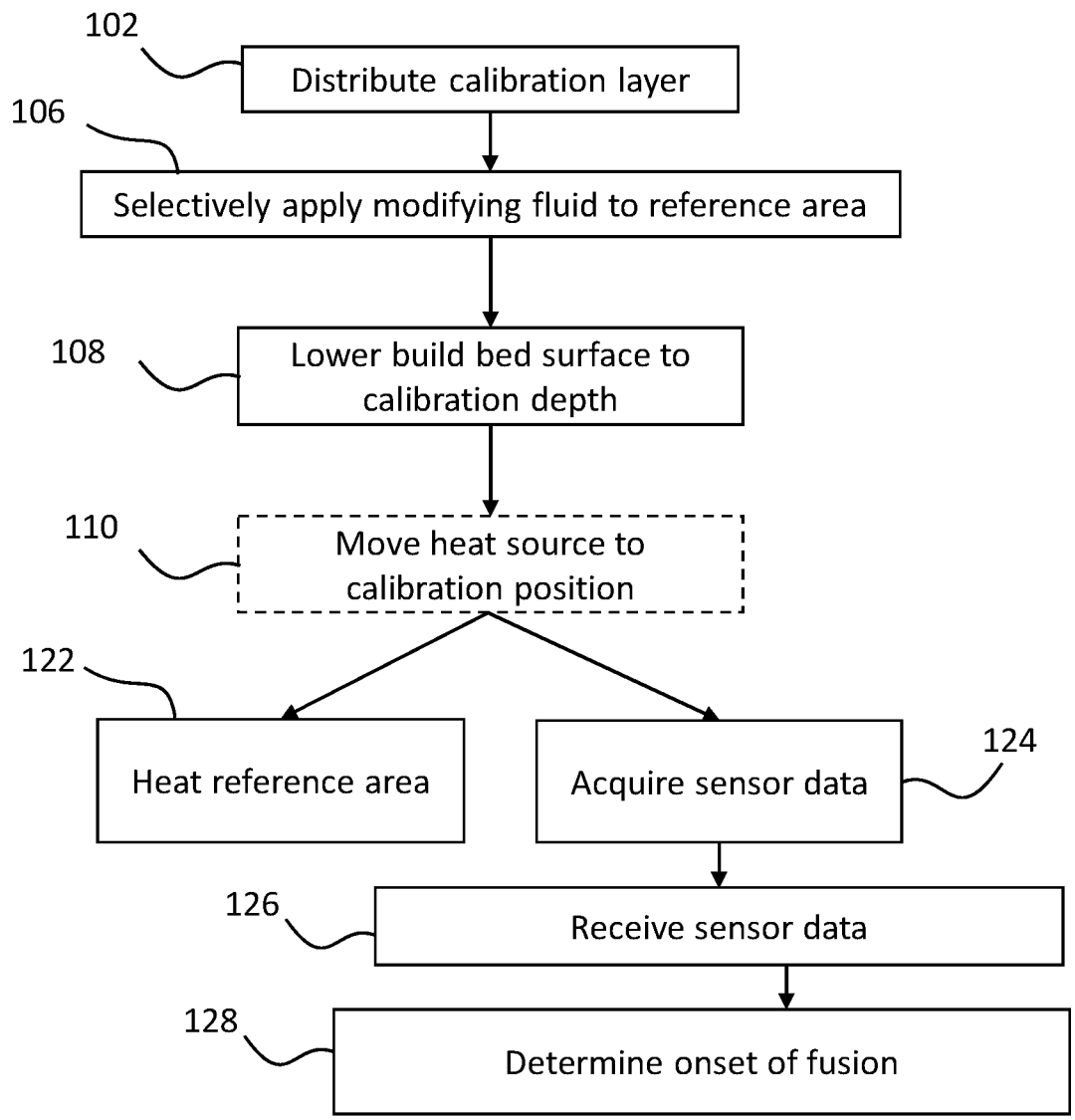
FIG. 7B is a block diagram of a variant of FIG. 7A (or of the subsequent FIG. 9) for modifying the heat impact on the reference area.

For example, for the variants of FIGS. 2A-2D, FIG. 4 and FIG. 6, the controller may be configured to control a means for lowering and raising the build bed floor, such that the build bed surface 12 is lowered to a calibration depth and the distance between the build bed surface 12 and the heat source is a calibration distance D. This reduces the heat impact on the reference area 54 compared to the normal operating distance between the build bed surface 12 and the heat source 36, 20 when an object is built. This variant of modifying the heat impact is illustrated in FIG. 7B with focus on step 108 in which the build bed surface is lowered. Optionally, at step 110, the heat source 36 is a moveable heat source and the controller is configured to move the heat source to the calibration position where it remains stationary for the duration of time over which the reference area is being heated. Furthermore, other measures may be applied to further reduce the heat impact, such as lowering the duty cycle of the heat source 36, 20. The controller 70 may further be configured to control a carriage 30 to move the moveable heat source 36 to the calibration position.

For the variants of FIG. 3 and FIG. 4, the controller 70 may be configured to modify the heat impact on the reference area 50 as necessary. With regard to FIG. 4, the controller 70 may be configured to modify the duty cycle of the heat source 36, 20. The controller may additionally, or instead, be configured to dynamically modify the distance between the heat source 36 and the build bed surface 12 (i.e. the 'calibration distance D') in synchronisation with the position of the moveable heat source 36 as the moveable heat source passes across the build bed surface, and across the reference area 50.

With regard to the variant of FIG. 3, the effectiveness of heating by the stationary overhead heater 20 may be improved by providing a fused base reference area 54 underneath the reference area 50 before starting the step of heating at step 122, thus increasing the impact of the radiation by the heat source 36, 20. The necessary steps in this case will have to precede the distribution of the calibration layer 52, and are indicated as step 200 in dashed outline of providing a base layer before the calibration layer 52 is deposited.

Figure 8:
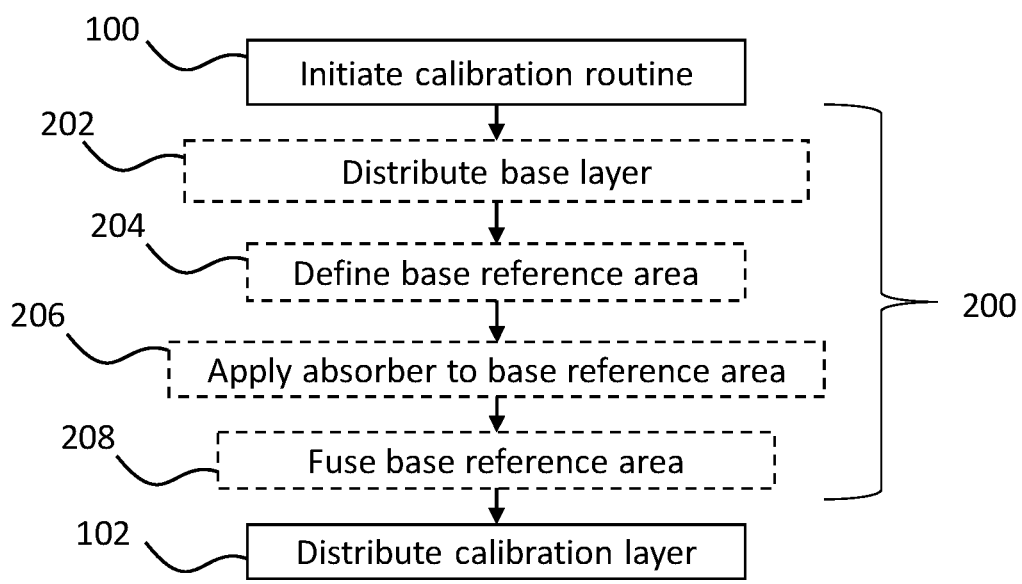
FIG. 8 is a block diagram of steps by the controller for providing a base layer with a fused base reference layer for at least some variants of the embodiments according to the invention.

The individual steps are illustrated in the block diagram in FIG. 8 in dashed outline and may be inserted between steps 100 and 102 of FIG. 7A.

Thus, with reference to FIG. 8, steps 202 to 208 provide for the controller 70 being configured to: control the distribution module to distribute a base layer of particulate material at step 202; receive data defining a base reference area 54 at step 204; at step 206 to control a fluid deposition module 38 to apply radiation-absorbing fluid to the base layer 56 to define the base reference area 54; and at step 208 to control a heat source 36 to fuse the base reference area 54.

In variants in which a fused base reference area 54 is provided as part of the calibration routine, the absorption-modifying fluid comprises absorber and the particulate material does not.

In all variants therefore, the step 108 of modifying the heat impact on the reference area 50 may be a combination of suitable measures to adjust the rate of heating of the reference area 50, and may comprise step 200.

Following step 108, or where step 108 is replaced by step 200 proceeding directly from step 106 of selectively applying absorption-modifying fluid, the controller 70 is configured to simultaneously control the steps 122 of heating the reference area 50 and of controlling the sensor to acquire data such as temperature measurements from the temperature sensor 72, and/or to acquire optical readings from an optical sensor 74.

The step 122 of heating the reference area 50 may either comprise the controller 70 being configured to: control the heat source 36 so as to heat at least a portion of the build bed comprising the reference area 50 (for example with respect to the variant of FIG. 2 having a moveable heat source 36 positioned in the calibration position, and optionally for the variant of FIG. 4 having a moving heat source 36); or to control a heat source 20, 36 so as to heat the build bed surface 12 (for example with respect to the variant of FIG. 3 having a static overhead heater and optionally for the variant of FIG. 4).

At step 126 the controller 70 is configured to receive temperature data from the sensor 72 and at step 128 to determine the onset of fusion from the temperature data (and/or to receive optical readings from the optical sensor 74 to determine the onset of fusion). These steps may be concurrent with the step of heating and acquiring data from the sensor(s), or they may happen subsequent to a timed step 122 of heating the reference area 54.

Once the onset of fusion has been determined, the controller 70 may be configured to apply the onset of fusion as a set point for the temperature measurements of the temperature sensor 72 at an optional step 130. For example, where the onset of fusion is detected for a specific temperature measurement, the onset of fusion corresponds to a specific point of the temperature scale of the sensor measurement, and the onset of fusion may be used as a set point to calibrate the temperature scale for any subsequent measurements made by the temperature sensor.

Second Embodiment

In a second embodiment, the reference area is an area substantially free of radiation absorber such that it does not preferentially fuse over the surrounding area in the absence of other measures being taken. A 'blank' reference area may be used to reduce the rate at which the reference area is heated by the heat source if the absorption spectrum of the reference area does not substantially coincide with the radiation spectrum of the heat source.

In a suitable calibration routine, selectivity of the reference area for the preferential absorption of heat is provided by a fused base reference area 54 defined within a base layer 56 that is to support the calibration layer 52.

Figure 5A:
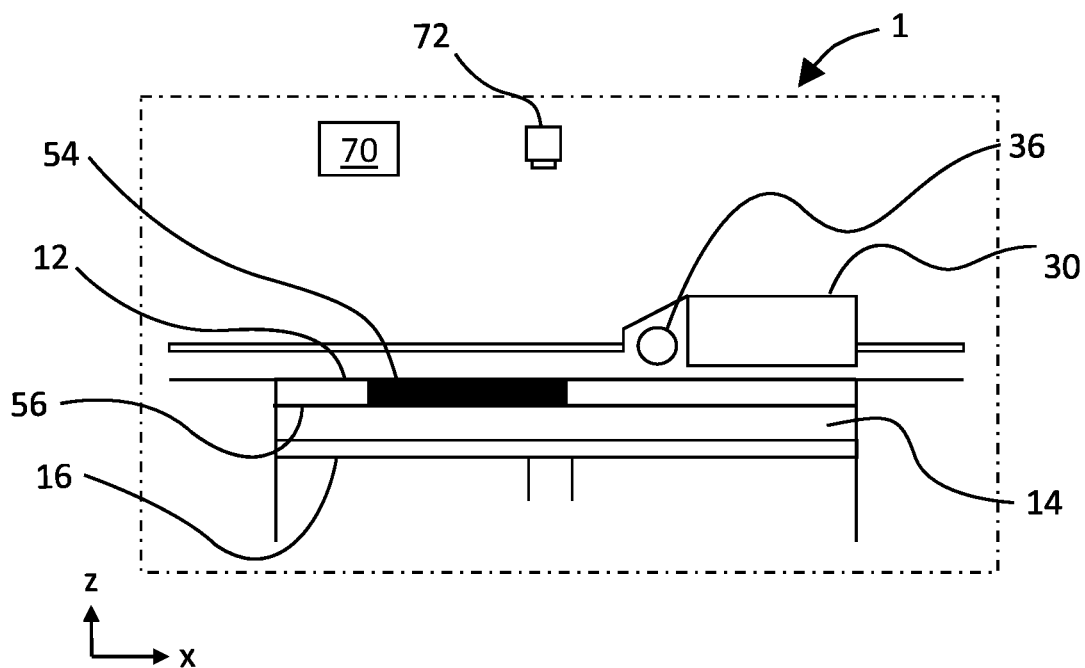
FIGS. 5A to 5D are schematic cross-sections of the apparatus carrying out steps of a first variant of the routine according to a second embodiment.

FIGS. 5A-5D illustrate an apparatus 1 (substantially as previously described with reference to FIG. 1) configured to carry out stages of an improved calibration routine according to the invention. FIG. 5A shows a base layer 56 distributed over the build bed 14 to form the build bed surface 12. The base layer 56 is next modified by defining and fusing a base reference area 54 comprised within the base layer 56. The base reference area 54 may for example be defined by radiation-absorbing fluid. This may be achieved by a printing module (not shown) supported on the carriage 30 which deposits radiation-absorbing fluid over the base reference area 54 as the carriage passes over the build bed surface 12.

Next, the apparatus may use a moveable heat source 36 supported on the carriage 30 to heat the base reference layer to achieve fusion, in any suitable manner. For example, the heat source 36 may pass across the build bed surface 12 while the heat source 36 is operated to apply heat.

Figure 5B:
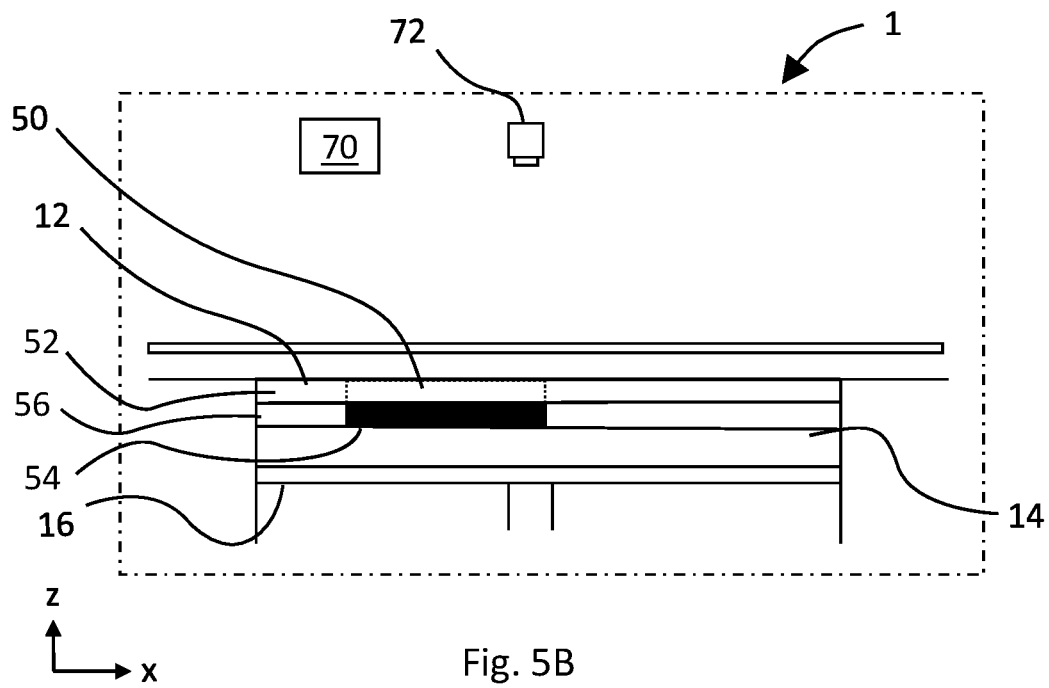

In FIG. 5B, the build bed 14 is lowered by a layer thickness by lowering the build bed floor 16, and a fresh layer of particulate material applied, which is to represent the calibration layer. The surface of the calibration layer forms the build bed surface 12. In this embodiment the reference area 50 is coincident with, and defined by, the fused base reference area 54.

Figure 5C:
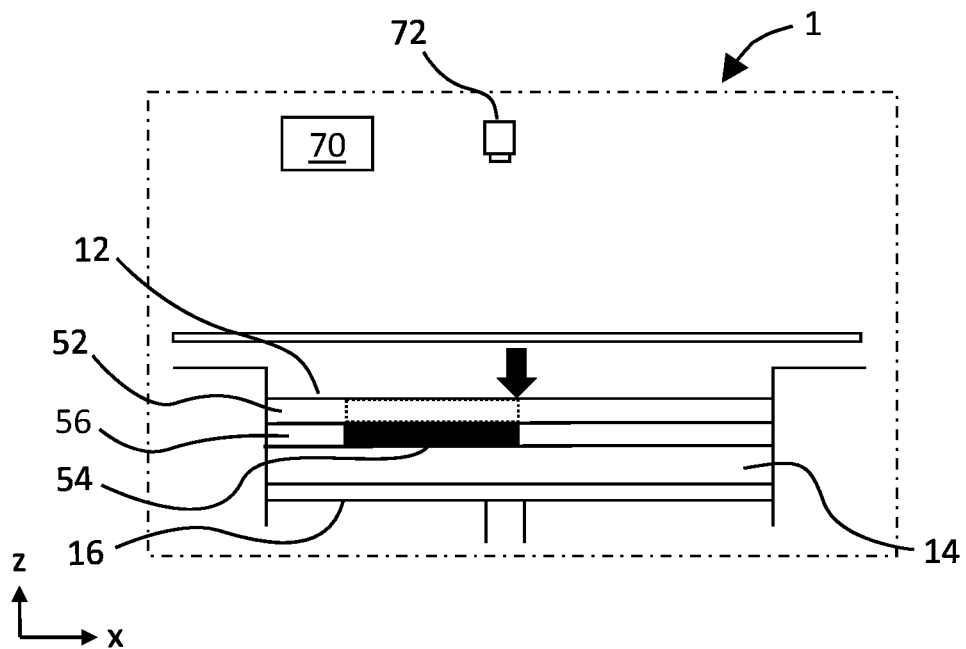

In FIG. 5C, the build bed is lowered to a calibration depth, by lowering the build bed floor 16. The build bed 14 may be lowered by more than a layer thickness, for example by several millimetres or tens of millimetres, so as to create a minimum calibration distance D between the heat source 36 and the build bed surface 12. The minimum calibration distance D may range from 5 mm to 120 mm, or preferably from 5 mm to 80 mm, from 5 mm to 50 mm, or more preferably still from 5 mm to 15 mm, when the heat source is located above the build bed 14.

Figure 5D:
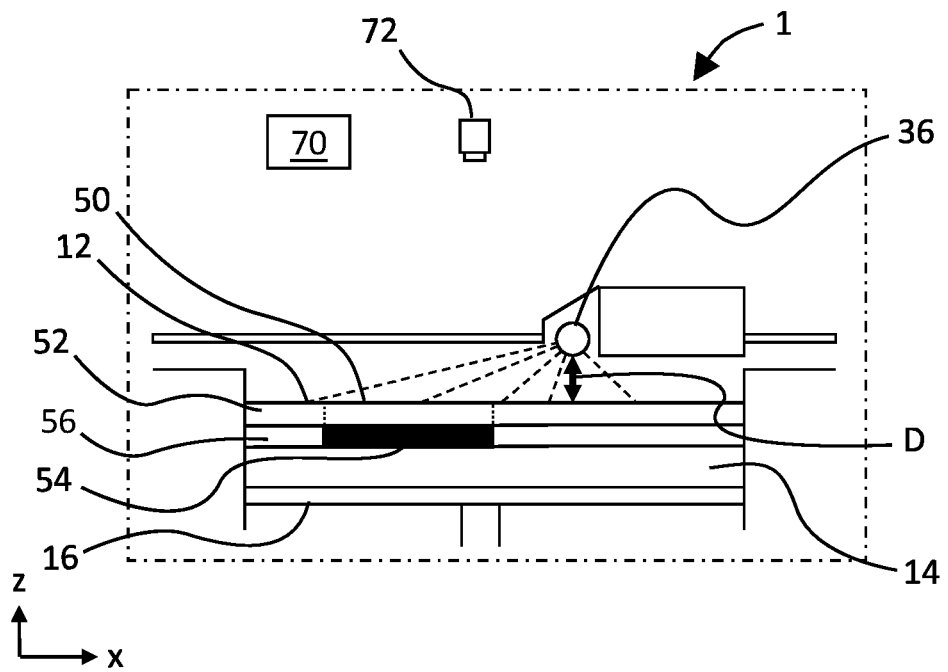

In FIG. 5D, the heat source is moved, similar to the step of the variant of the first embodiment described with respect to FIG. 2A, to a calibration position where it remains stationary for the duration of the step of heating the reference area 50. The calibration position is located off to one side of the reference area so as not to obscure the field of view of the sensor 72 as it monitors the temperature of the reference area 50. In some implementations, the calibration distance and the calibration position may be adjusted such that the reference area 50 extends to an area underneath the moveable heat source 36 while still being visible to the sensor 72.

During the heating step, the fused base reference area 54 provides an elevated base temperature to the reference area 50 within the calibration layer. Furthermore, the base reference area 54 provides a degree of selectivity to the reference area 50 over the area surrounding the reference area and which is not supported by a fused based layer area, and aids in heating the blank reference area so that upon irradiation by the heat source, the reference area 50 will reach the fusion temperature ahead of the surrounding area. The amount of absorber deposited over the base reference area per unit area may be adjusted to adjust the rate of heating of the reference area 50 during the heating step.

Similar to the variant of FIGS. 2A and 2B of the first embodiment, the radiation from the moveable heat source 36 positioned in the fixed calibration position can continuously provide energy to the reference area 50 without interruption, and the time-temperature behaviour from the sensor measurements do not have to be extrapolated to compensate for the effects of the passing heat source 36. Thus the sensor measurements over the duration of the calibration routine can be used to accurately determine the onset of fusion over the reference area 50.

The rate of heating of the reference area 50 and the accuracy of determining the onset of fusion may be adjusted suitably by adjusting the distance between the heat source 36 and the build bed surface 12 in the vertical direction (along z), and/or between the heat source 36 and the reference area 50 in the lateral direction (along x), and/or by adjusting the duty cycle of the heat source 36. This embodiment therefore also provides several parameters that allow tuning the calibration procedure by slowing down the rate of heating to achieve the desired accuracy.

The heat source 36 in FIGS. 5A and 5B, in analogy to the one shown in FIG. 2B, is elongate and spans the width of the build bed surface 12, so that the reference area 50 receives the same level of heating from the heat source 36 along a line of constant distance to the heat source 36. The reference area 50 may have a sufficiently large dimension over which the distance between the build bed surface 12 and the heat source varies linearly, which in analogy to FIG. 2A is along the direction orthogonal to the direction of elongation of the heat source (along the x-direction). The regions of the reference area 50 closest to the heat source 36 will fuse first and the regions furthest away will fuse last, and a progressive onset of fusion may be monitored against distance over the reference area 50 away from the heat source 36.

More than one reference area may be defined and fused in the same calibration routine while the sensor monitors the temperature of all the defined reference areas. The reference areas may be arranged near the edges of the build bed 14 or at regular intervals covering the build bed width along the direction of elongation of the heat source 36.

Therefore an alternative calibration method for calibrating the measurement of a temperature sensor 72 of an apparatus 1 for the layer-by-layer formation of a three-dimensional object from particulate material, comprises the steps of:
(a) distributing a base layer 56 of particulate material to form the build bed surface 12;
(b) applying radiation-absorbing fluid to the base reference area 54;
(c) fusing the particulate material of the base reference area 54 using a heat source to form a fused base reference area 54;
(d) distributing a layer of particulate material over the base layer to form the build bed surface 12, including a reference area 50 coincident with the base reference area 54;
(e) operating for a duration of time a heat source 36, 20 to apply heat to the build bed surface 12 (more particularly, to at least the portion of the build bed surface 12 comprising the reference area 50) while measuring, using the temperature sensor 72, the temperature increase of the reference area 50 (or a sub-reference area thereof), and/or taking optical readings, using an optical sensor 74, of the reference area 50 (or a sub-reference area thereof) over the duration of time and at least until the particulate material of the reference area 50 (or the sub-reference area thereof) begins to fuse;
(f) determining the onset of fusion of the particulate material from the measured temperature increase and/or from the optical readings of the optical sensor 74 over the duration of time of the reference area 50 (or the sub-reference area thereof); and
(g) applying the onset of fusion as a set point for subsequent temperature measurements of the sensor 72.

The reference area 50 in this embodiment is defined by the base reference area 54 and thus is coincident with the base reference area 54. Steps (a) to (c) may be repeated to provide more than one base reference layer and a corresponding stack of more than one fused base reference area. The heat source may be located over the build bed surface 12, and may be a moveable heat source 36.

The step of operating the heat source 36 to apply heat to the reference area 50 may be preceded by the steps of lowering the build bed surface 12 to a calibration depth; and positioning the moveable heat source 36 at a calibration position above the build bed surface 12; wherein the calibration depth defines a calibration distance D between the heat source 36 and the build bed surface 12. The calibration distance may be greater than 5 mm, and may range from 5 to 120 mm, and the step of applying heat by the moveable heat source 36 to the reference area 50 is carried out while the moveable heat source 36 remains in the calibration position. Preferably, the calibration distance D ranges from 5 mm to 90 mm, 5 mm to 80 mm, 5 mm to 50 mm or from 5 mm to 15 mm. As before, the calibration distance depends on other properties that may also be used to reduce the energy input to the build bed surface, such as reducing the power of the heat source and/or reducing the amount of infrared radiation absorber applied to the base reference area 54.

It should be noted that the order of steps of lowering the build bed surface and positioning the heat source in the calibration position are interchangeable; in other words the build bed surface 12 may be moved to the calibration depth after the moveable heat source 36 is positioned in the calibration position above the build bed surface 12.

The reference area may comprise a direct sub-reference area located directly underneath the moveable heat source 36, and the calibration position and the calibration distance D may be arranged to allow the sensor 72 to view the direct sub-reference area. The field of view over which the reference area is not obstructed by e.g. the moveable heat source 36 may be improved by increasing the distance between the heat source and the build bed surface, analogous to the description of FIG. 6 which equally applies to the arrangement of FIGS. 5A to 5D.

Additionally, or instead, the reference area 50 may be located off to one side of the calibration position, or the reference 50 may comprise a sub-reference area located off to one side of the direct sub-reference area when the heat source is in the calibration position, so that the sensor is measuring the temperature of an area within the reference area that is not located directly underneath the moveable heat source 36.

In a second variant of the second embodiment, instead of keeping the moveable heat source at a fixed calibration position for the duration of the heating and measuring steps, the step of operating the heat source to apply heat to the reference area is preceded by the step of lowering the build bed surface to a calibration depth, wherein the calibration depth defines a calibration distance D between the heat source 36 and the build bed surface 12 and may range from 5 mm to 120 mm, or from 5 mm to 80 mm; and wherein the step of applying heat by the moveable heat source 36 to the reference area 50 is carried out while the moveable heat source is repeatedly moved across the reference area 50 to heat the reference area at least until it begins to fuse.

Additionally, instead of maintaining a constant calibration distance D during the heating and measuring steps, the calibration distance D may be dynamically adjusted as the heat source is moved across the reference area, optionally while the power output of the heat source 36 is dynamically adjusted with the variation in calibration distance D. The calibration distance D and optionally also the power output of the heat source may thus be dynamically adjusted as the heat source is repeatedly moved across the reference area. For example, dynamic adjustment may be based on encoder position information of the carriage to which the moveable heat source is mounted. By adjusting both calibration distance D and the power output of the heat source, a consistent heating effect by the heat source may be achieved (e.g. the larger the distance between the heat source and the build bed surface, the higher the duty cycle) while allowing the sensor to detect the direct sub-reference area underneath the moving heat source 36, where the direct reference area is comprised within the reference area 50. In this arrangement using a moving heat source 36, multiple reference areas 50_n located at different locations across the build bed surface may be heated and measured in a relatively quickly procedure compared to multiple procedures necessary to capture similar locations when involving a moveable heat source in a fixed calibration position.

The moveable heat source 36 may be a near-infrared lamp with a spectrum that overlaps at least partially with the absorption spectrum of the radiation-absorbing fluid. The moveable heat source 36 may be the same as the heat source used to fuse the base reference area, and operated at a reduced duty cycle of below 50% for example. The moveable heat source 36 may for example be operated to output a power of 500 Watts or less, or 300 Watts or less. As with the variant of FIG. 4, the heating effect on the build bed surface may be modified by adapting the speed at which the heat source travels across the build bed surface, or by adjusting the amount of radiation-absorbing fluid in the base reference area.

The methods of the second embodiment may be carried out by an apparatus 1 for the manufacture of a three-dimensional object by layer-by-layer deposition of particulate material having a controller 70 configured to carry out any of the steps of the calibration routine described.

Figure 9:
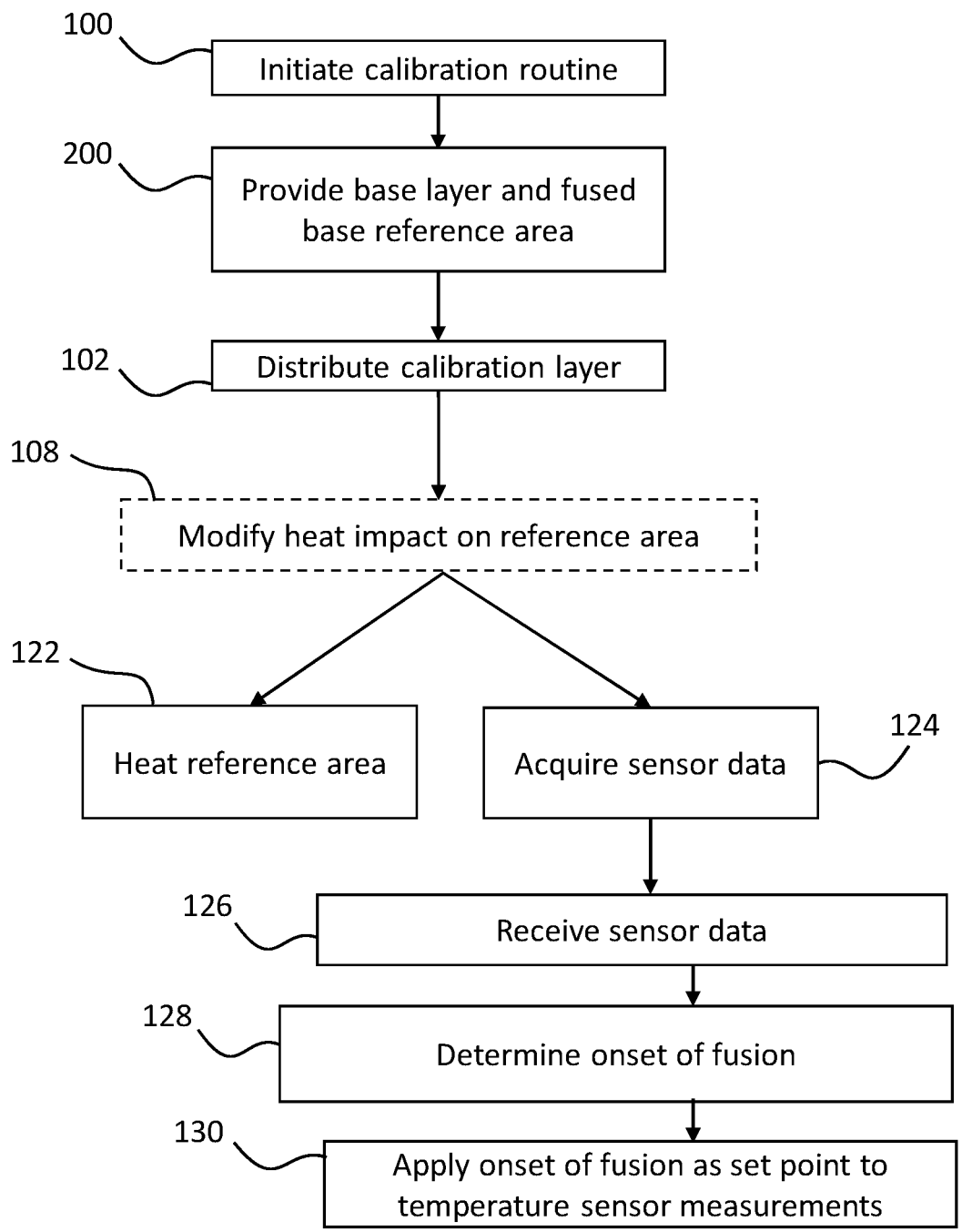
FIG. 9 is a block diagram of steps by a controller for the apparatus to control the steps of a calibration routine according to the second embodiment.

FIG. 9 is a block diagram illustrating the capability of such a controller 70. The controller is configured to, at step 100, initiate the calibration routine.

At step 200 the controller is configured to control the apparatus to provide a base layer 56 having a fused base reference area 54_n, the individual steps of which are illustrated in the block diagram in FIG. 8 and are inserted between steps 100 and 102 of FIG. 9. Thus, with reference to FIG. 8, at step 202 the controller is configured to control a distribution module to distribute the base layer 56 of particulate material.

At step 204, the controller is configured to receive data defining a base reference area 54 that is to coincide with the reference area 50, and at step 206 to control a fluid deposition module 38 to apply radiation-absorbing fluid to the base layer 56 to define the base reference area 54 based on the data received. At step 208, the controller is configured to control a heat source 36 to apply heat to the base reference area 54 so as to fuse it.

Returning to FIG. 9, next, at step 102, the controller 70 is configured to control the distribution module again to distribute a calibration layer 52 of particulate material across the build bed 14 to form a new build bed surface 12.

At an optional step 108, the controller may be configured to control one or more of the build bed height, the heat source position and heat source duty cycle to modify the heat impact on the reference area during the step 122 of controlling the heat source to heat the reference area at least until it, or at least until a sub-reference area comprised within the reference area, begins to fuse. For example for the variant of FIGS. 5A-5D, the controller may be configured to control the height of the build bed floor so as to lower the build bed surface 12 to a calibration depth and to control the position of the heat source 36 (for example by controlling the carriage 30) so as to locate it at the calibration position, such that the distance between the build bed surface 12 and the heat source is a calibration distance D. This reduces the heat impact on the reference area 50 compared to the normal operating distance between the build bed surface 12 and the heat source when an object is built. This variant is illustrated in FIG. 7A and the same description for steps 108 and 110 apply. Furthermore, other measures may be applied to further reduce the heat impact, such as lowering the duty cycle of the heat source.

Following optional step 108, the controller is configured to simultaneously control the heat source 36, 20 and the sensor 72 to carry out step 122 of heating the reference area 50 and step 124 of acquiring data from the temperature sensor 72 and/or the optical sensor 74.

The step 122 of heating the reference area 50 may either comprise the controller 70 controlling the heat source 20, 36 so as to heat at least a portion of the build bed surface 12 comprising the reference area 50 (as with the variant of FIG. 5 having a moveable heat source 36 positioned in the calibration position) or controlling the fixed overhead heat source 20 to heat the build bed surface 12.

At step 126 the controller 70 is configured to receive temperature data from the sensor 72 and at step 128 to determine the onset of fusion from the temperature data. These steps may be concurrent with the step 122 of heating and step 124 of acquiring data, or they may happen subsequent to the duration of time over which step 122 of heating the reference area 50 is applied.

Once the onset of fusion has been determined, the controller 70 may further be configured at step 130 to apply the onset of fusion as a set point or calibration reference for the temperature measurements of the sensor 72. For example, where the onset of fusion is detected for a specific temperature measurement, the onset of fusion corresponds to a specific sensor measurement, for which the onset of fusion may be used as a set point to calibrate the temperature scale of any subsequent measurements made by the sensor.

For the calibration methods described with reference to FIGS. 2A-2D, FIGS. 5A-5D, FIG. 6 and FIG. 10, in which the build bed surface 12 is lowered and the heat source is a moveable heat source 36, the apparatus 1 may be controlled by a controller 70 that is configured to:
- (a) receive data defining a reference area 50, within the build bed surface 12, of unfused particulate material;
- (b) control a distributor to distribute a calibration layer 52 of particulate material over the build bed 14 to form the build bed surface 12;
- (c) control a build bed height control means to lower the build bed surface 12 to a calibration depth;
- (d) control a moveable heat source 36, moveable across the build bed surface 12, to heat the reference area 50 (or a sub-reference area thereof) over a duration of time at least until the reference area 50 (or the sub-reference area thereof) begins to fuse;
- (e) receive temperature measurements of the reference area 50 (or the sub-reference area thereof) comprised within the build bed surface 12 from a temperature sensor 72 and/or receive optical readings in respect of the reference area 50 (or the sub-reference area thereof) from an optical sensor 74;
- (f) determine from the temperature measurements and/or from the optical readings over the duration of time the onset of fusion; and
- (g) apply the onset of fusion as a set point or calibration reference for subsequent temperature measurements of the temperature sensor 72.

The moveable heat source may be mounted to a carriage 30 arranged to move across the build bed surface 12, and the controller 70 may further be configured to, before controlling the heat source to heat the reference area at least until the reference area begins to fuse: control the carriage 30 to move the heat source 36 to a calibration position above the build bed surface 12, wherein the calibration depth defines a calibration distance D between the heat source and the build bed surface 12; and control the heat source at the calibration position to heat the reference area 50 at least until it begins to fuse.

As before, the calibration distance D may range from 5 mm to 120 mm, and may preferably range from 5 mm to 50 mm, or more preferably from 5 mm to 90 mm, from 5 mm to 80 mm, or from 5 mm to 15 mm. The droplet deposition module and the heat source may be supported on the same carriage 30.

The controller may further be configured to receive at least one calibration depth and one calibration position, and optionally one sensor position, that are determined such that when a direct sub-reference area comprised within the reference area 50 is located substantially directly underneath the moveable heat source, and the sensor has a field of view that comprises the direct reference area. In other words, in this arrangement the direct sub-reference area is not obstructed from the view of the sensor and the sensor 72 can continuously capture temperature measurements (and/or the optical sensor 74 can take readings continuously) from the direct sub-reference area during the calibration procedure.

The controller 70 may further be configured to receive position dependent temperature measurements from the sensor that correspond to different positions measured within the reference area. For example, the controller may receive measurements from the sensor that correspond to a sub-reference area located off to one side of the calibration position of the heat source, where the sub-reference area is comprised within the reference area 50. Additionally or instead, the controller may be configured to receive position dependent temperature measurements (or optical readings) from the sensor that correspond to different positions measured within multiple reference areas 50_n.

In variants in which a moveable radiation source is used to repeatedly move across the reference area 50 to heat it until it begins to fuse, the controller may further be configured to control the depth of the build bed surface 12 (in the vertical direction) so as to define a minimum calibration distance D between the moving heat source 36 and the build bed surface 12, and to control a carriage 30 supporting the moveable heat source 36 and moveable across the build bed surface 12 to repeatedly move the moveable heat source 36 back and forth across the reference area 50 to heat at least a sub-reference area comprised within the reference area until the sub-reference area begins to fuse. The calibration distance is greater than a normal operating depth during which an object is built in the apparatus and may range from 5 mm to 120 mm, or from 5 mm to 80 mm, and may remain fixed for the duration of controlling the heating and measuring of the reference area 50.

The controller 70 may additionally be configured to dynamically adjust the calibration distance D and the power output of the heat source 36 as the heat source is moved across the reference area 50, in synchronisation with the position of the heat source 36 above the build bed surface 12. The controller may for example be configured to receive position information from the carriage encoder that relates to the position of the heat source above the build bed surface, and to adjust the calibration depth and the power output of the moveable heat source such that the calibration distance and the power output of the heat source are synchronised with the position of the heat source above the build bed surface.

The controller 70 may cause the sensor 72 to measure the temperature of one or more direct sub-reference areas comprised within the reference area 50 and that are located periodically directly underneath the moving heat source as it passes back and forth over the reference area 50, and to receive measurements from the one or more direct sub-reference areas. The controller 70 may further be arranged to extrapolate the measurements received from the sensor 72 to determine the onset of fusion from the one or more direct sub-reference areas.

In some variants of the calibration routine, the controller may be arranged to control a fluid deposition module 38 to apply absorption-modifying fluid to the reference area 50. The fluid deposition module 38 may for example deposit radiation-absorbing material over the reference area 50 so that upon heating with the heat source, the reference area fuses ahead of the area surrounding the reference area.

In addition, the controller 70 may be arranged to control the apparatus 1 to provide a base layer 56 comprising a fused base reference area 54 ahead of controlling the distribution module to distribute the calibration layer 52. In this case, the controller 70 is configured to control the distributor to distribute, at the start of the calibration routine, a base layer 56 of particulate material, and to control the deposition module 38 to apply radiation-absorbing fluid to a base reference area 54 within the base layer, for example based on data received by the controller that defines the location of the reference area 50. The controller 70 may further be configured to control the moveable heat source 36 to pass over the base reference area 54 and to heat the base reference area 54 so as to fuse it.

General Considerations

In the embodiments and their variants described herein, it is not necessary for the area to be monitored by the sensor to be the same area as defined to represent the reference area. For example, the reference area as defined by radiation absorber may comprise a sub-reference area that is monitored by the sensor while the reference area is being heated. The sub-reference area may comprise the direct sub-reference area; alternatively the direct sub-reference area may be an area removed from the sub-reference area while both are comprised within the reference area. Defining a reference area 50 larger than a sub-reference area 50A to be monitored may be useful to allow a rough alignment of the heat source 36 above the build bed surface 12 once the build bed surface 12 has been lowered to the calibration depth, as the alignment of the sensor array with respect to the build bed surface at the normal build depth is liable to deviate in the x- and y-direction. In some cases however, the sub-reference area 50A may be the same (and coincident with) the reference area 50.

It is therefore also not necessary to apply heat to the reference area by the heat source at least until the particulate material within the reference area 50 begins to fuse; it is sufficient that at least some of the particulate material within of the sub-reference area begins to fuse. In some variants, the process of heating is determined by the direct sub-reference area fusing and its eventual temperature.

Furthermore, the sensor used to monitor the reference area 50, or the sub-reference area 50A comprised within the reference area 50, may alternatively be an optical sensor 74 as indicated in FIG. 1 and arranged to detect a physical property such as a colour change or reflectance change of the surface of the sub-reference area (or reference area) while it is being heated over the duration of time. As the area undergoes fusion, a sudden change to a particular colour (in the case of where the radiation modifying fluid contains the absorber carbon black, a change to deep black) may be detected. Alternatively the sensor may be positioned to detect the specular reflection of a light beam directed at the area, the sensor detecting a change in the reflection response as the area undergoes fusion and turns from an unfused, rough surface into a liquid, reflective surface. The onset of fusion as detected by an optical sensor 74 may be used to calibrate the temperature scale of a thermal sensor also present in the apparatus by simultaneously monitoring the temperature increase with the temperature sensor for the duration of the time over which the sub-reference area (or reference area) is being heated. By comparing the time stamps between the data recorded by the optical sensor 74 and the temperature measurements by the temperature sensor 72, the onset of fusion can be correlated to the corresponding temperature measurement and the temperature scale of the temperature sensor can be calibrated to the onset of fusion. The use of an optical sensor, and in combination with the temperature sensor where a temperature sensor requires calibration to the onset of fusion, is applicable to all variants irrespective of the way in which the sub-reference area, or reference area, is being heated.

Further still, once the onset of fusion has been determined, the onset of fusion may be applied as a set point for subsequent measurements by the sensor 72. This may comprise applying the set point to the scale of the corresponding temperature map of the sensor that indicated the onset of fusion to a reference temperature, so that any subsequent temperature measurements made by the sensor are relative to the onset of fusion. This calibrated scale takes into account changes in the properties of the particulate material due to recycling rate and/or ageing of at least some of the components of the particulate material.

The onset of fusion as measured by the temperature sensor of the apparatus may be set to an absolute temperature equal to the inherent onset of fusion temperature. The absolute fusion temperature may have been determined by a separate measurement outside of the apparatus using for example a calorimeter, such as a differential scanning calorimeter, to calibrate the sensor to an absolute temperature scale.

The temperature sensor 72 may be a thermal camera that captures time-dependent (time-stamped) temperature maps of the build bed surface over the duration of the calibration routine. The thermal maps are analysed and from the time-temperature behaviour in the reference areas the onset of fusion may be determined. The temperature corresponding to the onset of fusion may applied as a set point to the temperature scale of the temperature maps of the sensor 72.

In some apparatus, the heat source may be directly visible to the sensor. For example, the user may have removed the lamp housing, or the lamp housing may comprise one or more openings in its roof so as to be directly visible to the sensor. Direct vision of the heat source by the sensor may be beneficial as follows. In routines in which the build bed surface is lowered, variation in the position of the build bed surface with respect to the sensor may occur due to the container walls 10 not being perfectly vertical, leading to a change in the x and y positions of the build bed surface with respect to the sensor. After lowering the build bed surface to the calibration distance, it is desirable to determine which of the sensor pixels are to monitor a region within the direct sub-reference area that is located substantially directly underneath the heat source and that will experience the highest power from the heat source due to being closest to it.

Figure 10:
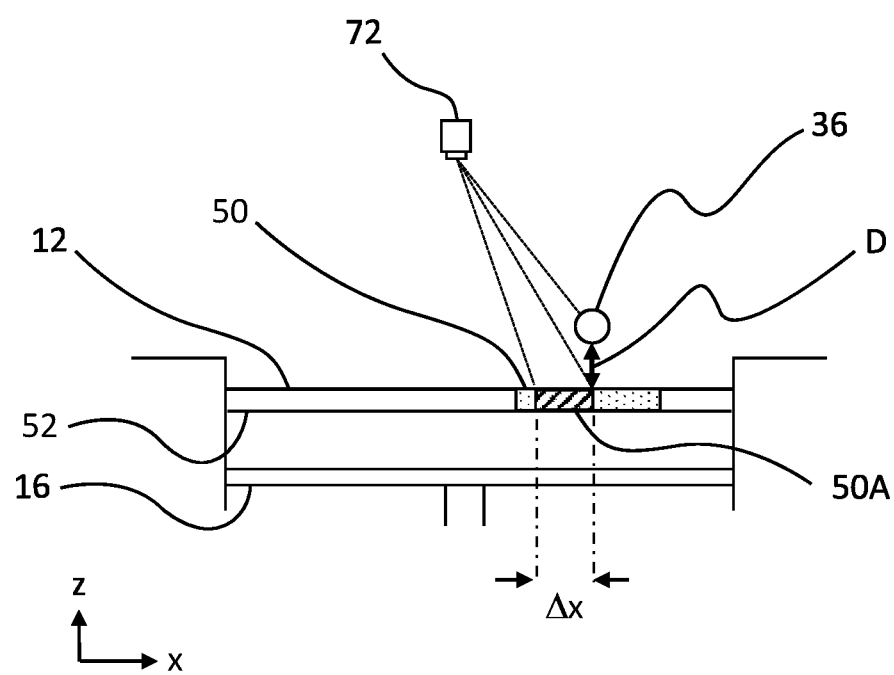
FIG. 10 is a schematic cross-section of the apparatus illustrating the definition of a sub-reference area.

With reference to FIG. 10, the moveable heat source 36 has been moved to the calibration position above the reference area 50 and the build bed surface 10 has been lowered to the calibration depth defining the calibration distance D. The temperature sensor 72 has a direct line of sight of the heat source, in other words when the heat source is operated and starts to warm up, and the sensor 72 is able to detect its temperature and thus its position within the thermal image. Next, the heat source is operated at a power sufficiently low so as to prevent significant heating of the reference area 50, for example briefly at a low duty cycle, while the sensor 72 records an image of the build bed surface 12 with the heat source 36 above it. From the sensor pixels that correspond to the heat source position as imaged, a geometric conversion may be applied to determine which pixels are to be used to monitor a region within the direct sub-reference area at the calibration distance D underneath the heat source. In this way, the location of the direct sub-reference area in the sensor image based on the imaged location of the moveable heat source may be defined. Measurements of temperature, using the temperature sensor 72, of regions within the direct sub-reference area may be used to control the duration of the step of heating by the heat source and to terminate the step once a threshold temperature has been detected. In other words, the duration of time of step (d) of applying heat to the reference area is controlled by terminating the step of heating the reference area when the monitored temperature of the direct sub-reference area reaches a threshold temperature. In this way, excessive fusion of particulate material beneath and potentially beyond the reference area may be avoided. The steps may be carried out by the controller 70.

The size of the reference area 50 is chosen to ensure that, in the event of lateral deviations along the x-direction (perpendicular to the direction of elongation of the moveable heat source, for example) when the build bed surface is lowered to the calibration distance D, the heat source remains positioned above it, while still providing a region (sub-reference area 50A) sufficiently large enough to at least one side of the heat source 36 to be monitored and analysed to reliably determine the onset of fusion. This region may be chosen to fall within the reference area 50. In other words, a sub-reference area 50A may be monitored that is comprised within the reference area 50, and for the misalignment reasons discussed above may be smaller than the reference area. From the pixel, or pixel line, corresponding to the direct sub-reference area (in this example, due to the elongate heat source being an elongate area parallel to the axis of the heat source), a sub-array of sensor pixels may be defined to monitor the sub-reference area 50A, the sub-reference area 50A extending perpendicular to the direction of elongation of the direct sub-reference area over a distance $\Delta x$ from one side of direct sub-reference area. Alternatively the sub-reference area 50A may extend to both sides of the direct sub-reference area along a direction perpendicular to the direction of elongation of the direct sub-reference area.

The temperature sensor 72 may monitor the temperature of the reference area 50 or of all or some of the build bed surface 12. It may comprise an array of pixels where each pixel corresponds to a sub area of the build bed surface 12, and the onset of fusion may be determined for each pixel corresponding to that sub-reference area or a group of pixels corresponding to a group of sub-reference areas.

The reference area 50 may be defined as part of a cross-section of the calibration layer to be fused by providing the apparatus 1 with a bitmap of layers to be processed and that define the reference area 50 and/or, where applicable, the sub-reference area 50A and/or base reference area 54. In any of the above routines more than one reference area 50 may be arranged to be fused. A second reference area may or may not comprise radiation-absorbing material so as to be fused. More than one fused reference area 50 provides more than one position dependent (or sensor pixel dependent) measurement of the onset of fusion which may allow normalisation between sensor pixels or groups of sensor pixels based on their corresponding onset of fusion.

In some calibration routines, more than one reference area 50 may be defined on the build bed surface 12. A second reference area 50 may overlie or coincide with a fused base reference area 54. Alternatively, it may not overlie a fused base reference area 54 but instead be monitored alongside the reference area 50 to be fused. Any of the calibration routines described may therefore further comprise the step of measuring, during the step of measuring the temperature increase of the (first) reference area 50_1, the temperature increase of a second reference area 50_2 over time; and determining the onset of fusion of the particulate material from the measured temperature increase over time of the first reference area 50_1 and of the second reference area 50_2.

In the case where a base layer 56 is provided with a base reference area 54, the one or more reference areas 50 may overlie the same base reference area 54 or they may overlap or coincide with individual corresponding base reference areas 54. In addition, one or more second reference areas may be defined to be monitored that are not to fuse. For example, in cases where the particulate material does not comprise radiation-absorbing material, the second reference area may not be provided with radiation-absorbing material by deposition with a radiation-absorbing fluid deposited by a printing module. Where a base layer is provided, the second reference area may not overlie the base layer and thus is not selectively heated by a base reference area 54.

Upon application of heat by the heat source 36, 20, the temperature sensor 72 may monitor the temperature of a plurality of reference areas 50 until at least one of them begins to fuse, and the onset of fusion may be determined based on the measurements of the plurality of reference areas 50, for example based on a first reference area 50_1 that reached the onset of fusion and a second reference area 50_2 that may or may not have reached the onset of fusion. The temperature sensor 72, such as a thermal camera, may be located above the build bed surface 12 to monitor the full area of the build bed surface 12. In some arrangements, the thermal camera 72 may be located within the area of the fixed overhead heater 20.

The moveable heat source 36 may be an infrared lamp emitting a near infrared spectrum of radiation, and the lamp may be elongate and span the width of the build bed surface 12. The moveable heat source 36 may be supported on the carriage 30, or it may be supported on a second carriage arranged to move across the build bed surface 12. During the calibration routine, the moveable heat source 36 may be operated at a power output of 500 Watts or less, preferably at 300 Watts or less. For a 3 kW heat source, this may correspond to a duty cycle of less than or equal to 17%, or less than or equal to 10%, so as to reduce the rate of heating of the reference area 50. However the power output chosen will also depend on the calibration distance D, for example, and may be higher than 500 Watts for calibration distances D near the higher end of the range of 5 mm to 120 mm.

The power output of the heat source used to heat the reference area 50 may be variable and may be controlled based on measurements of the build bed surface 12 and/or based on measurement of the one or more reference areas 50, or sub-reference areas comprised within a reference area 50, by a sensor, such as by the sensor 72. A controlled variable power output may be achieved by using any known closed or open loop temperature control methods, or combinations thereof. During such control methods, the power output of the heat source may vary about an average power output of 500 Watt or less, but this average may be higher depending on the distance between the heat source and the build bed surface 12; for example it may be dependent on a constant or variable calibration distance D.

The absorption-modifying fluid may be a radiation-absorbing fluid with an absorption spectrum that at least partially overlaps with the radiation spectrum of the moveable heat source 36, in which case the fluid deposition module 38 is arranged to apply the radiation-absorbing fluid to the reference area 50. The fluid deposition module 38 may optionally be arranged to apply a reduced amount of absorption-modifying fluid to the reference area 50 compared to that applied during a normal build process, so as to reduce the rate of heating of the reference area 50.

The overhead heater 20 may comprise a plurality of individually controllable heating elements arranged in a regular matrix or arranged in an irregular pattern over the overhead heater area. Each individual heating element has a corresponding area of influence of heat impact on the build bed surface 12. Thus the reference area 50 may be heated with a subset of one or more of the plurality of individual heating elements of the fixed overhead heater 20.

The apparatus 1 may comprise a controller 70 arranged to carry out any of the calibration routines described above with reference to FIGS. 2A to 5D. In some cases where no onset of fusion of the reference area could be determined, the controller 70 may be configured to issue an alert to a user that one of the heat source, the deposition module, or the sensor may not be operating correctly.

The invention claimed is:

1. A method for determining a set point for measurements from a temperature sensor of an apparatus for the layer-by-layer formation of a three-dimensional object from particulate material, the apparatus having a moveable heat source, the method comprising:
   (a) distributing a calibration layer of particulate material over a build bed surface;
   (b) selectively applying absorption-modifying fluid to a reference area or to an area surrounding a reference area, on the build bed surface;
   (c) lowering the build bed surface to a calibration depth, wherein the moveable heat source is moveable across the build bed surface, and wherein the calibration depth defines a calibration distance D between the moveable heat source and the build bed surface greater than a build depth at which the object is built;
   (d) applying heat to the reference area using the moveable heat source while measuring, using the temperature sensor, the temperature increase of a sub-reference area comprised within the reference area over a duration of time, at least until the particulate material of the reference area begins to fuse; and/or taking optical readings, using an optical sensor, of an optical property of the sub-reference area over the duration of time;
   (e) determining the onset of fusion of the particulate material from the measured temperature increase and/or from a change in the optical property over the duration of time of the reference area; and
   (f) applying the onset of fusion as the set point for subsequent temperature measurements of the temperature sensor.

2. The method of claim 1, wherein the calibration depth defines a minimum calibration distance between the moveable heat source and the build bed surface of between 5 mm and 120 mm.

3. The method of claim 1 further comprising, after the step of lowering the build bed surface and before the step of applying heat to the reference area, moving the moveable heat source to a calibration position above the reference area and, with the moveable heat source stationary in the calibration position, carrying out step (d) of applying heat to the reference area for the duration of time and taking readings, using the sensor, in respect of the sub-reference area.

4. The method of claim 3, wherein the sub-reference area comprises a direct sub-reference area located substantially directly underneath the moveable heat source, and wherein the calibration position and the calibration depth are arranged to allow the sensor to view the direct sub-reference area.

5. The method of claim 4, wherein the calibration position and the calibration depth are arranged to allow the sensor to view the direct sub-reference area continuously over the duration of time.

6. The method of claim 1, wherein for the duration of the steps of applying heat to the reference area and taking readings, using the sensor, in respect of the sub-reference area over time, the moveable heat source is repeatedly moved across the reference area.

7. The method of claim 6, wherein the calibration distance D is dynamically adjusted, and wherein the duty cycle of the heat source is dynamically adjusted as the moveable heat source is moved across the reference area.

8. The method of claim 1, wherein the heat source is a near-infrared lamp, and one of the absorption-modifying fluid and the particulate material comprises a near-infrared radiation-absorbing material.

9. The method of claim 4, wherein the moveable heat source is directly visible to the temperature sensor, and wherein after step (c) of lowering the build bed surface, the method further comprises the steps of:
   moving the moveable heat source to the calibration position above the reference area;
   operating the moveable heat source at a power sufficiently low so as to prevent significant heating of the reference area while imaging the moveable heat source using the temperature sensor, and
   defining the location of the direct sub-reference area in the temperature sensor image based on the imaged location of the moveable radiation source;
   measuring, using the temperature sensor, the temperature increase of the direct sub-reference while applying heat to the reference area in step (d); and
   terminating the step of applying heat to the reference area when the monitored temperature of the direct sub-reference area reaches a threshold temperature.

10. The method of claim 1, wherein the absorption-modifying fluid is applied to the reference area and comprises infrared radiation-absorbing material;
   optionally wherein the method further comprises, before the step of distributing the calibration layer, the steps of:
      distributing a base layer of particulate material over the build bed to form the build bed surface, and
      applying radiation-absorbing fluid to a base reference area comprised in the base layer, wherein the base reference area overlaps at least partially with the reference area; and
      fusing the particulate material of the base reference area using the moveable heat source, and optionally repeating steps (a) to (c) one or more times.

11. The method of claim 1, wherein the particulate material comprises radiation-absorbing material and the absorption-modifying fluid comprises absorption-inhibiting material and is applied to the area surrounding the reference area to inhibit fusion of the particulate material upon heating.

12. The method of claim 1, wherein the sensor is a temperature sensor, and wherein step (d) of taking readings comprises measuring the temperature increase of the sub-reference area, and wherein step (e) comprises determining the onset of fusion from the measured temperature increase over time;
   optionally wherein the method further comprises, after step (e), the step of applying the onset of fusion as the set point for subsequent temperature measurements of the temperature sensor.

13. The method of claim 1, wherein the or a further sensor is an optical sensor, and wherein step (d) of taking readings comprises monitoring, using the optical sensor, an optical property of the sub-reference area for the duration of time, and wherein step (e) comprises determining the onset of fusion from a change in the optical property over time;
   optionally wherein the method further comprises, after step (e), the step of applying the onset of fusion as the set point for subsequent temperature measurements of the temperature sensor.

14. A method for calibrating the measurement of a temperature sensor of an apparatus for the layer-by-layer formation of a three-dimensional object from particulate material, the method comprising:

(a) distributing a base layer of particulate material to form the build bed surface;
(b) applying radiation-absorbing fluid to a base reference area comprised in the base layer;
(c) fusing the particulate material of the base reference area using a heat source to form a fused base reference area;
(d) distributing a layer of particulate material over the base layer to form the build bed surface, including a reference area coincident with the base reference area;
(e) lowering the build bed surface to a calibration depth, the calibration depth defining a calibration distance D between a moveable heat source and the build bed surface that is greater than a build depth at which the object is built;
(f) operating the moveable heat source above the build bed surface to apply heat to the build bed surface while measuring, using the temperature sensor, the temperature increase of a sub-reference area comprised within the reference area over time, at least until the particulate material of the sub-reference area begins to fuse, and/or taking optical readings, using an optical sensor, of an optical property of the sub-reference area over the duration of time;
(g) determining the onset of fusion of the particulate material from the measured temperature increase over time across the sub-reference area, or where an optical sensor is used in step (f), determining the onset of fusion from the optical readings; and
(h) applying the onset of fusion as determined in step (g) as a set point for subsequent temperature measurements of the temperature sensor.

15. The method of claim 14, further comprising, between steps (d) and (e) or between steps (e) and (f), the step of positioning the moveable heat source at a calibration position above the reference area, and wherein the step of operating the moveable heat source to apply heat to the build bed surface in step (f) is carried out while the moveable heat source remains stationary in the calibration position.

16. The method of claim 14, wherein the moveable heat source is directly visible to the sensor, and wherein after step (e) of lowering the build bed surface and before step (f) of applying heat to the reference area, the method further comprises the steps of:
moving the moveable heat source to the or a calibration position above the reference area;
operating the moveable heat source at a power sufficiently low so as to prevent significant heating of the reference area while imaging the moveable heat source using the sensor, and
defining the location of the direct sub-reference area in the sensor image based on the imaged location of the moveable heat source;
measuring, using the temperature sensor, the temperature increase of the direct sub-reference while applying heat to the reference area in step (d); and
terminating the step of applying heat to the reference area when the monitored temperature of the direct sub-reference area reaches a threshold temperature.

17. The method of claim 14, wherein the step of applying heat by the moveable heat source to the build bed surface in step (f) is carried out while the moveable heat source is repeatedly moved across the build bed surface to heat the reference area at least until the sub-reference area begins to fuse;
optionally wherein the heat source of step (c) operated to fuse the particulate material of the base reference area is the moveable heat source of step (f).

18. The method of claim 17, wherein the calibration distance D and the power output of the moveable heat source are dynamically adjusted as the heat source is moved across the reference area.

19. The method of claim 1, further comprising:
measuring, during the step of measuring the temperature increase across the sub-reference area, the temperature increase of a second sub-reference area comprised within a second reference area over the duration of time, and optionally, where an optical sensor is used in step (f), taking readings using the optical sensor of the second sub-reference area over the duration of time; and
determining the onset of fusion of the particulate material from the measured temperature increase over the duration of time across the sub-reference area and across the second sub-reference area, or where an optical sensor is used in step (f), determining the onset of fusion from the optical sensor readings over the duration of time across the second sub-reference area and across the second sub-reference area.

20. A controller configured to carry out a calibration routine based on the onset of fusion of particulate material, for an apparatus for the manufacture of a three-dimensional object by layer-by-layer deposition of particulate material over the surface of a build bed, the controller being configured to:
(a) receive data defining a reference area, within the build bed surface, of unfused particulate material;
(b) control a distributor to distribute a calibration layer of particulate material over the build bed to form the build bed surface;
(c) control a build bed height controller to lower the build bed surface to a calibration depth greater than a build depth at which the object is built;
(d) control a moveable heat source, moveable across the build bed surface, to heat the reference area for a duration of time at least until a sub-reference area comprised within the reference area begins to fuse;
(e) over the duration of time, receive temperature measurements of the sub-reference area from a temperature sensor, and/or receive optical readings of an optical property from an optical sensor of the sub-reference area;
(f) determine from the temperature measurements or the optical readings taken over the duration of time the onset of fusion, and
(g) apply the onset of fusion as the set point for subsequent temperature measurements of the temperature sensor.

* * * * *